(12) United States Patent
Nitta

(10) Patent No.: US 11,477,339 B2
(45) Date of Patent: Oct. 18, 2022

(54) IMAGE FORMING APPARATUS FORMING IMAGE OF SCANNED SOURCE DOCUMENTS ON RECORDING SHEETS

(71) Applicant: KYOCERA Document Solutions Inc., Osaka (JP)

(72) Inventor: Tsuyoshi Nitta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/389,173

(22) Filed: Jul. 29, 2021

(65) Prior Publication Data
US 2022/0038593 A1 Feb. 3, 2022

(30) Foreign Application Priority Data
Aug. 3, 2020 (JP) .............................. JP2020-131950

(51) Int. Cl.
*H04N 1/04* (2006.01)
*H04N 1/00* (2006.01)
*G03G 15/00* (2006.01)

(52) U.S. Cl.
CPC ..... *H04N 1/00748* (2013.01); *G03G 15/5062* (2013.01); *G03G 15/6582* (2013.01); *H04N 1/00734* (2013.01)

(58) Field of Classification Search
CPC ........... H04N 1/00748; H04N 1/00734; G03G 15/5062; G03G 15/6582
USPC .................. 358/3.26, 1.15, 488, 496, 498
See application file for complete search history.

(56) References Cited

U.S. PATENT DOCUMENTS

| 4,623,975 A | * | 11/1986 | Kagami | ............... B65H 7/14 |
| | | | | 250/559.22 |
| 9,699,339 B2 | * | 7/2017 | Mori | ............... H04N 1/00745 |

FOREIGN PATENT DOCUMENTS

JP 2010-160611 A 7/2010

* cited by examiner

*Primary Examiner* — Cheukfan Lee
(74) *Attorney, Agent, or Firm* — IP Business Solutions, LLC

(57) ABSTRACT

An image forming apparatus includes a controller that causes an image reading device to suspend reading a source document, when a decider decides that a shortage value of a source image is equal to or larger than a first threshold, causes a display device to display a message that the first threshold is changed to a predetermined second threshold larger than the first threshold, stores the source image, or causes the image forming device to form the source image, when a reading resuming instruction, to resume reading the source document at least including the source document the reading of which has been suspended, is received by an operation device, and when the decider decides that the shortage value of the source image is smaller than the second threshold, and causes, when there is a next source document, the image reading device to read the next source document.

9 Claims, 15 Drawing Sheets

SUB SCANNING DIRECTION

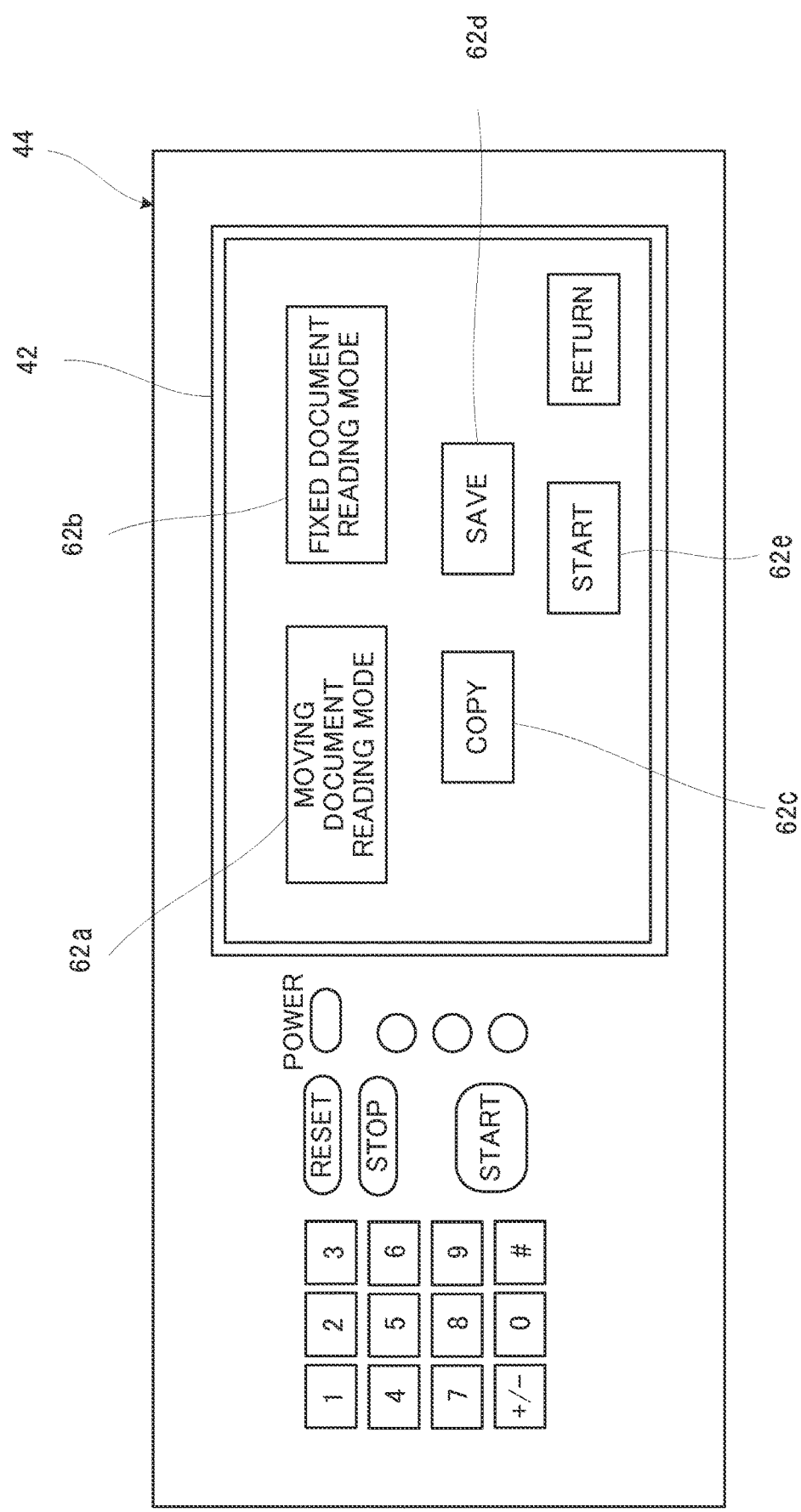

IMAGE FORMING APPARATUS FORMING IMAGE OF SCANNED SOURCE DOCUMENTS ON RECORDING SHEETS

INCORPORATION BY REFERENCE

This application claims priority to Japanese Patent Application No. 2020-131950 filed on Aug. 3, 2020, the entire contents of which are incorporated by reference herein.

BACKGROUND

The present disclosure relates to an image forming apparatus, an in particular to a control to be performed when a dog-ear of a source document is detected during a reading operation of a plurality of source documents.

Existing image forming apparatuses, in general, include an image reading device that sequentially draws out a plurality of source documents from a tray and sequentially reads the image on each of the source documents, and an image forming device that sequentially records each of the source images on a recording sheet, and outputs the recording sheets. In the case where, for example, a corner portion of any of the plurality of source documents, sequentially drawn out from the tray to be read, is folded (i.e., the document is dog-eared), the image of the source document that has been read also has a missing corner. In this case, the image of the source document with a missing corner is recorded on the recording sheet. Further, some image forming apparatuses are configured to detect a dog-ear in the source document that has been read.

SUMMARY

The disclosure proposes further improvement of the foregoing techniques.

In an aspect, the disclosure provides an image forming apparatus including an image reading device, a display device, an operation device, an image forming device, and a control device. The control device includes a processor and functioning, through the processor executing a control program, as a missing portion detector, a decider, and a controller. The image reading device sequentially reads respective images of a plurality of source documents. The operation device is to be operated by a user. The image forming device forms a source image of each of the plurality of source documents read by the image reading device, on a recording sheet. The missing portion detector detects whether the source image has a missing corner, each time the image reading device reads the plurality of source documents one by one, as the source image. The decider decides whether a shortage value, indicating a scale of the missing corner in the source image, is equal to or larger than a first threshold, when the missing portion detector detects the missing corner in the source image. The controller (i) stores the source image, or causes the image forming device to form the source image, when the decider decides that the shortage value of the source image is smaller than the first threshold, and causes, when there are one or more next source documents, the image reading device to read the next source documents, and (ii) causes the image reading device to suspend reading, when the decider decides that the shortage value of the source image is equal to or larger than the first threshold, causes the display device to display a notice that the first threshold is changed to a predetermined second threshold larger than the first threshold, stores the source image, or causes the image forming device to form the source image, when a reading resuming instruction, to resume reading the source documents at least including the source document the reading of which has been suspended, is received by the operation device, and when the decider decides that the shortage value of the source image is smaller than the second threshold, and causes, when there are one or more next source documents, the image reading device to read the next source documents.

BRIEF DESCRIPTION OF THE DRAWINGS

FIG. 8A and FIG. 8B are plan views each showing an operation device and a display device of the image forming apparatus according to the embodiment;

DETAILED DESCRIPTION

Hereafter, an embodiment of the disclosure will be described, with reference to the drawings.

Figure 1:
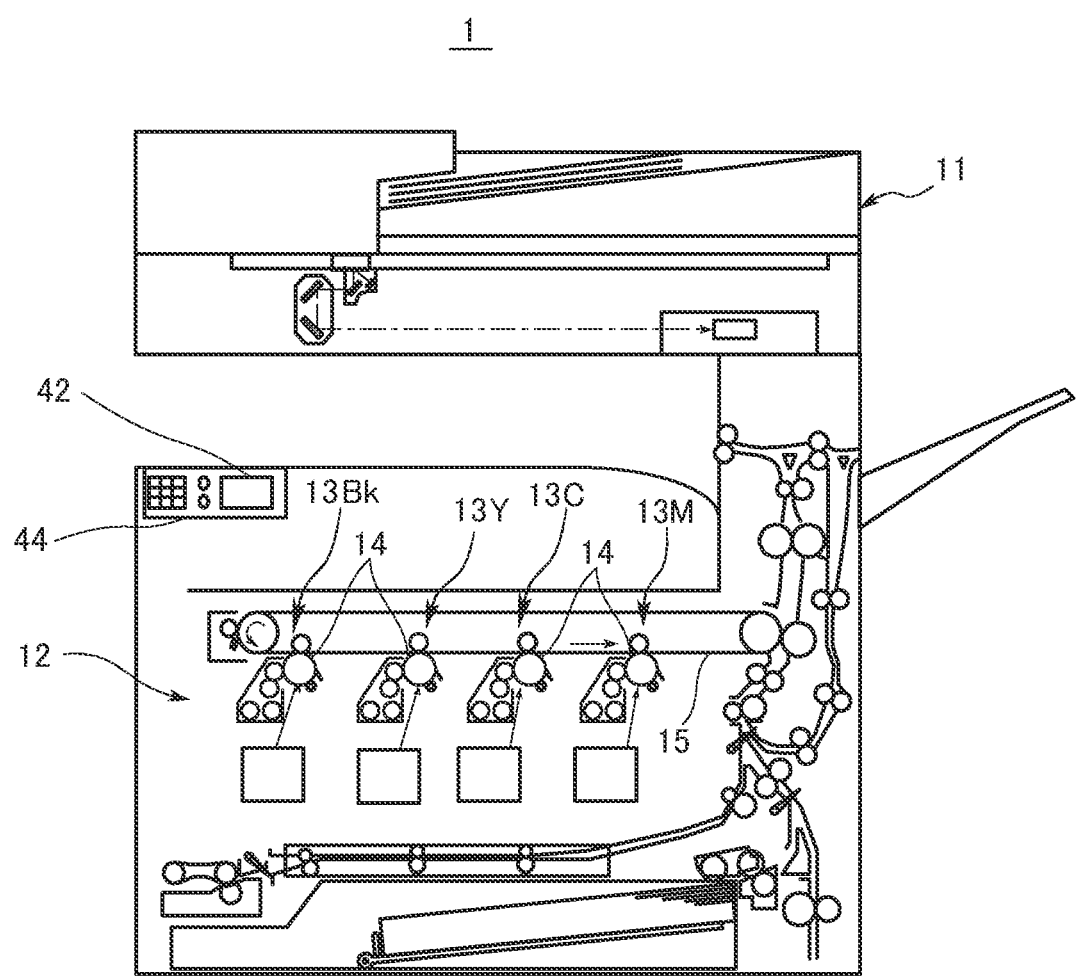
FIG. 1 is a cross-sectional view showing an image forming apparatus according to an embodiment of the disclosure.

FIG. 1 is a cross-sectional view showing an image forming apparatus according to the embodiment of the disclosure. The image forming apparatus 1 is a multifunction peripheral (MFP) having a plurality of functions including, for example, a copying function, a printing function, a scanning function, and a facsimile function. The image forming apparatus 1 includes an image reading device 11 and an image forming device 12.

The image reading device 11 includes a scanner that optically reads a source document, and generates image data representing the image of the source document.

The image forming device 12 prints an image represented by the image data generated by the image reading device 11, on a recording sheet. The image forming device 12 includes an image forming unit 13M for magenta, an image forming unit 13C for cyan, an image forming unit 13Y for yellow, and an image forming unit 13Bk for black. In each of the image forming units 13M, 13C, 13Y, and 13Bk, the surface of a photoconductor drum 14 is uniformly charged, and an electrostatic latent image is formed on the surface of the photoconductor drum 14 by exposure. Then the electrostatic latent image on the surface of the photoconductor drum 14 is developed into a toner image, and the toner image on the photoconductor drum 14 is transferred to an intermediate transfer roller 15. Thus, the color toner image is formed on the intermediate transfer roller 15. The color toner image is transferred to a recording sheet from the intermediate transfer roller 15, and thermally fixed onto the recording sheet.

Figure 2:
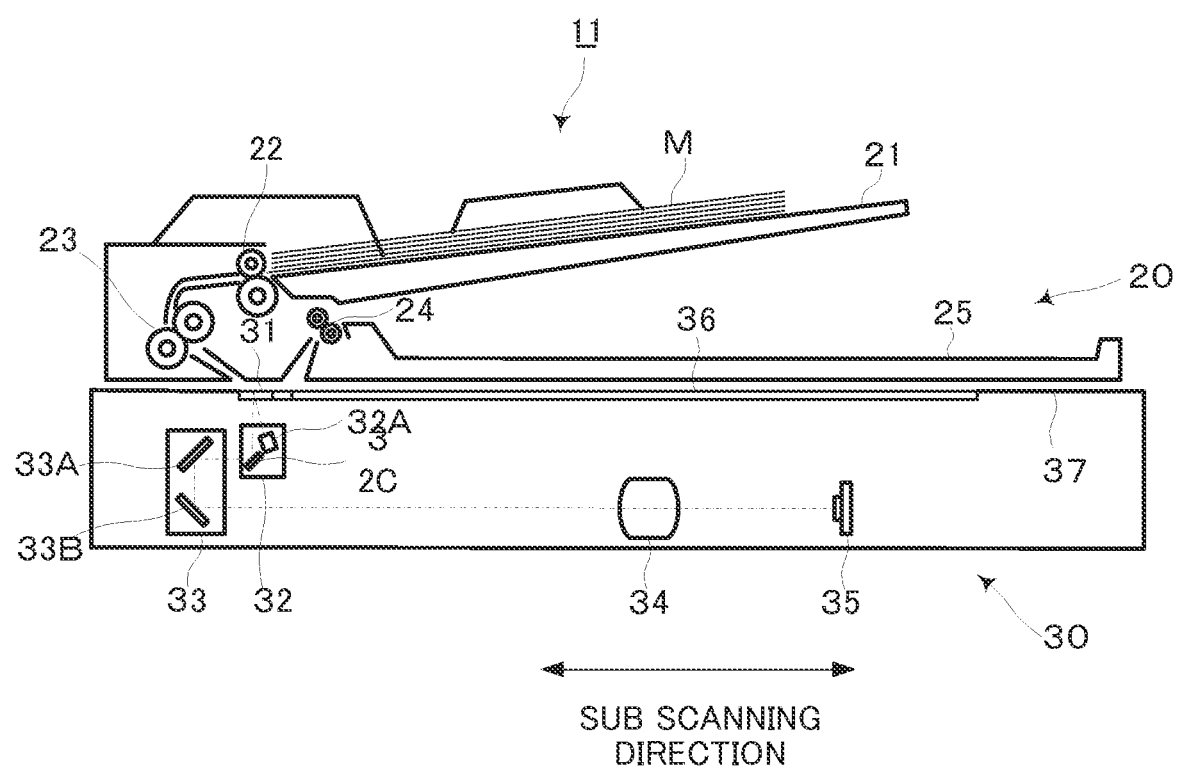
FIG. 2 is a cross-sectional view showing an image reading device provided in the image forming apparatus according to the embodiment.

FIG. 2 is a cross-sectional view showing a mechanical configuration of the image reading device 11 according to this embodiment. As shown in FIG. 2, the image reading device 11 includes a document table 37 having a first platen glass 31 and a second platen glass 36 (contact glass) on which a source document M is placed, a document tray 21 on which a plurality of source documents M are placed, a document discharge tray 25, a document feeding device 20, and a scanner unit 30.

The scanner unit 30 includes a carriage 32, an optical unit 33 including a mirror 33A and a mirror 33B, a condenser lens 34, and a CCD sensor 35. The carriage 32 extends in a main scanning direction. The carriage 32 includes a light source 32A, for example constituted of a light emitting diode (LED), and a mirror 32C that reflects reading light reflected by the source document M, to the CCD sensor. The carriage 32 is configured to reciprocate in a sub scanning direction Y, along a rail extending in the sub scanning direction Y.

The document feeding device 20 draws out, in a moving document reading mode, the plurality of source documents M placed on the document tray 21 one by one, with a pickup roller 22, a transport roller 23, and a discharge roller 24, transports the source document M over the first platen glass 31, and discharges the source document M to the document discharge tray 25. In the scanner unit 30, the light from the light source 32A of the carriage 32 is emitted to the source document M through the first platen glass 31, and the light reflected by the source document M is reflected by the mirror 32C of the carriage 32. Such light is further reflected by the mirror 33A and the mirror 33B of the optical unit 33, and incident into the CCD sensor 35 through the condenser lens 34. As result, the condenser lens 34 forms the image of the source document M on the photodetection surface of the CCD sensor 35, so that the CCD sensor 35 reads the image of the source document M.

In a fixed document reading mode, the document feeding device 20 moves the carriage 32 to a reading start position for reading the source document M placed on the second platen glass 36, and starts the reading of the source document M at the reading start position. The carriage 32 emits the reading light from the light source 32A to the source document M, while moving from the reading start position in the sub scanning direction Y (to the right in FIG. 2) under the second platen glass 36. Accordingly, the reading light sequentially acquired from the source document M is reflected by the mirror 32C of the carriage 32, and the mirror 33A and the mirror 33B of the optical unit 33, and is incident into the condenser lens 34. As result, the condenser lens 34 forms the image of the source document M on the photodetection surface of the CCD sensor 35, so that the CCD sensor 35 reads the image of the source document M.

Figure 3:
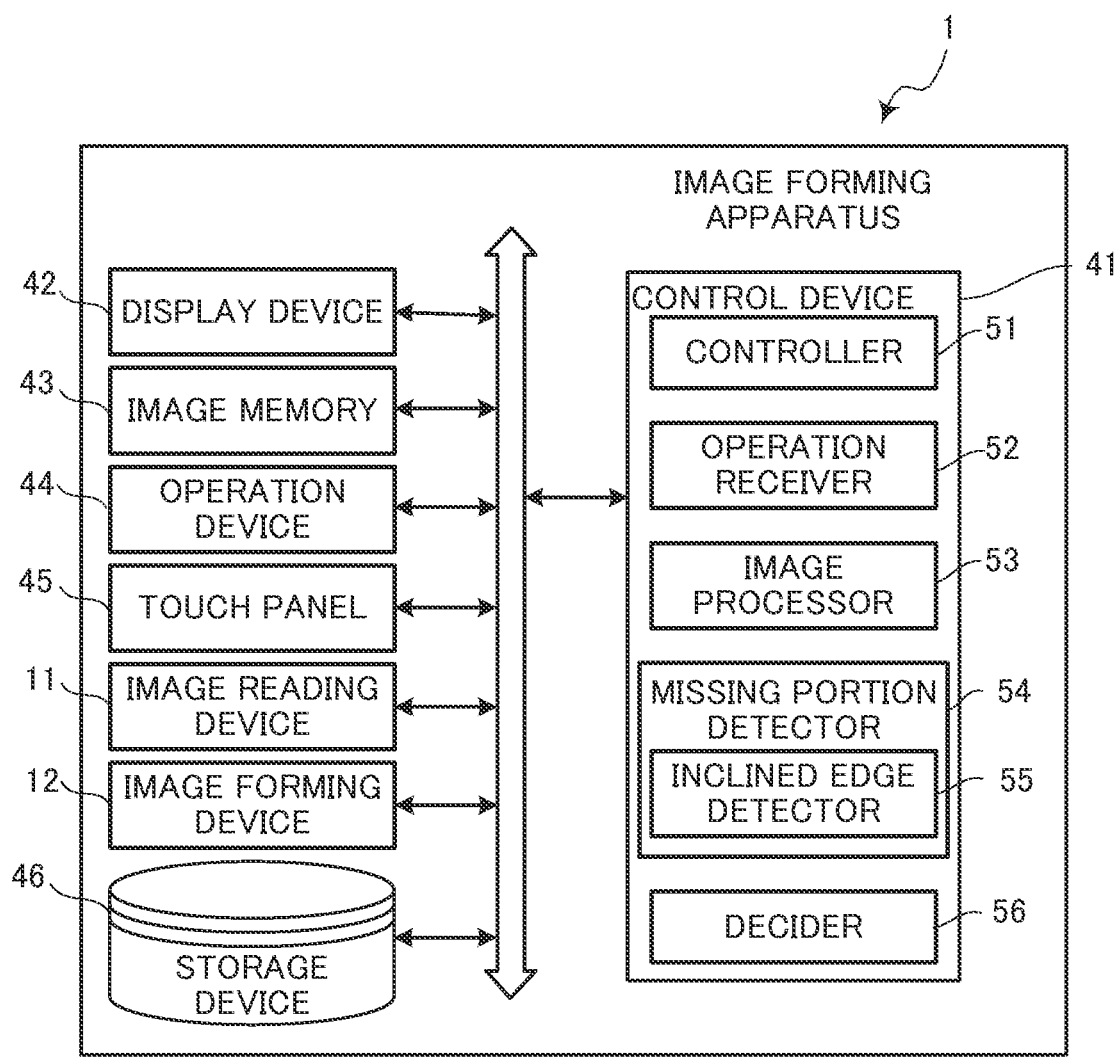
FIG. 3 is a functional block diagram showing an essential internal configuration of the image forming apparatus according to the embodiment.

FIG. 3 is a functional block diagram showing an essential internal configuration of the image forming apparatus 1. As shown in FIG. 3, the image forming apparatus 1 includes a control device 41, a display device 42, an image memory 43, an operation device 44, a touch panel 45, an image reading device 11, an image forming device 12, and a storage device 46.

The display device 42 is, for example, constituted of a liquid crystal display (LCD) or an organic light-emitting diode (OLED) display.

The touch panel 45 is overlaid on the screen of the display device 42. The touch panel 45 is based on what is known as a resistive film or electrostatic capacitance. The touch panel 45 detects a contact (touch) of the user's finger made on the touch panel 45, along with the touched position, and outputs a detection signal indicating the coordinate of the touched position, to an operation receiver 52 of the control device 41 to be subsequently described. Accordingly, the touch panel 45 serves as an input device, utilized to input an operation performed by the user on the screen of the display device 42. Here, the operation device 44 and the touch panel 45 exemplify the operation device in the disclosure.

In the image memory 43, the image data representing the source document read by the image reading device 11 is temporarily stored.

The operation device 44 includes hard keys such as an enter key and a start key.

The storage device 46 is a large-capacity storage device such as a hard disk drive (HDD).

The control device 41 includes a processor, a random-access memory (RAM), a read-only memory (ROM), and so forth. The processor is, for example, a central processing unit (CPU), a micro processing unit (MPU), an application specific integrated circuit (ASIC), or the like. The control device 41 acts as a controller 51, the operation receiver 52, an image processor 53, a missing portion detector 54, and a decider 56, when the processor executes a control program stored in the ROM or the storage device 46. Here, the mentioned components of the control device 41 may each be constituted in the form of a hardware circuit, instead of being realized according to the control program.

The controller 51 serves to control the overall operation of the image forming apparatus 1.

The operation receiver 52 is configured to receive the user's operation performed on the touch panel 45, according to the detection signal outputted from the touch panel 45. The operation receiver 52 is also configured to receive the user's operation performed on the hard keys of the operation device 44.

The controller 51 controls the display device 42 so as to display an input screen for inputting the settings necessary for the image forming, or various types of information, and an operation guidance for operating the image forming apparatus 1.

The image processor 53 performs various types of image processing, to the image data in the image memory 43.

The missing portion detector 54 detects, each time the image reading device 11 reads the source documents one by one, whether the source image that has been read has a missing corner. To be more detailed, each time the image reading device 11 reads the source documents one by one, the missing portion detector 54 includes an inclined edge detector 55 that detects the edges of the source image, and also detects whether there is an inclined edge at a corner portion of the source image. When the inclined edge detector 55 detects an inclined edge, the missing portion detector 54 decides that the source image has a missing corner, and when the inclined edge detector 55 has not detected an inclined edge, the missing portion detector 54 decides that the source image is without a missing corner. Here, the inclined edge detector 55 may be configured to decide that the source image is without the inclined edge, when the length of the inclined edge is shorter than a predetermined reference length (e.g., 2 mm).

The decider 56 decides, when the missing portion detector 54 detects a missing corner in the source image, whether a shortage value, indicating the scale of the missing corner in the source image, is equal to or larger than a predetermined first threshold (e.g., 10 mm). To be more detailed, when the inclined edge detector 55 detects an inclined edge in the source image, the decider 56 calculates, as the shortage value, the length of missing edges to an intersection, defined when one of the edges of the source image that meets one end of the inclined edge (first edge), and another of the edges that meets the other end of the inclined edge (second edge), are extended along the direction of each of such edges. Then the decider 56 decides whether the length of at least one of the missing edges is equal to or longer than the first threshold.

The controller 51 (i) stores the source image in the storage device 46, or causes the image forming device 12 to form the source image, in the case where the inclined edge detector 55 has not detected an inclined edge, or when the decider 56 decides that the shortage value of the source image is less than the first threshold. When there are one or more next source documents, the controller 51 causes the image reading device 11 to read the next source documents.

In contrast, the controller 51 (ii) causes the image reading device 11 to suspend the reading of the source document, when the decider 56 decides that the shortage value of the source image is equal to or larger than the first threshold. Then the controller 51 causes the display device 42 to display a notice to the effect that the first threshold is changed to a predetermined second threshold (e.g., 15 mm) larger than the first threshold. Then, in the case where a reading resuming instruction, to resume reading the source documents at least including the source document the reading of which has been suspended, is received by the operation device 44, the controller 51 stores the source image, or causes the image forming device 12 to form the source image, when the decider 56 decides that the shortage value of the source image is less than the second threshold. When there are one or more next source documents, the controller 51 causes the image reading device 11 to read the next source documents.

Further, the controller 51 (iii) causes the image reading device 11 to suspend the reading of the source document, when the decider 56 decides that the shortage value of the source image is equal to or larger than the second threshold. Then the controller 51 causes the display device 42 to display a notice to the effect that the second threshold is changed to a predetermined third threshold (e.g., 20 mm) larger than the second threshold. Then, in the case where the reading resuming instruction, to resume reading the source documents at least including the source document the reading of which has been suspended, is received by the operation device 44, the controller 51 stores the source image, or causes the image forming device 12 to form the source image, when the decider 56 decides that the shortage value of the source image is less than the third threshold. When there are one or more next source documents, the controller 51 causes the image reading device 11 to read the next source documents.

When the decider 56 decides that the shortage value of the source image is equal to or larger than the third threshold, the controller 51 restricts the storage of the source image, or restricts the image forming device 12 from forming the source image. When there are one or more next source documents, the controller 51 causes the image reading device 11 to read the next source documents. Then, when the image reading device 11 finishes the sequential reading of the images of the plurality of source documents, the controller 51 causes the display device 42 to display the page number of the source image that was restricted.

Further, the controller 51 decides which mode is set, the moving document reading mode in which the image reading device 11 reads the source documents M, delivered one by one by the document feeding device 20, with the scanner unit 30 through the first platen glass 31, or the fixed document reading mode in which the image reading device 11 reads the source document M placed on the second platen glass 36, with the scanner unit 30.

When the user touches a touch key 62a representing the moving document reading mode, for example shown in FIG. 8B to be subsequently referred to, the touch operation is received through the touch panel 45, and the controller 51 decides that the moving document reading mode has been set. In contrast, when the user touches a touch key 62b representing the fixed document reading mode, the touch operation is received through the touch panel 45, and the controller 51 decides that the fixed document reading mode has been set. It will be assumed here that the user has touched a touch key 62c representing the copying function, and that the copying operation based on consecutive reading is performed. Here, in the case where the user touches a touch key 62d representing the storage function, the storage operation based on consecutive reading is performed.

In the moving document reading mode, the controller 51 causes the missing portion detector 54 to detect a missing corner in the source image. In the fixed document reading mode, in contrast, the controller 51 restricts the missing portion detector 54 from detecting a missing corner in the source image.

In the moving document reading mode of the image reading device 11, the plurality of source documents M set on the document tray 21 are drawn out one by one, and the respective images of the source documents M are sequentially read. Then source images im of the source documents M are stored in the image memory 43, each time the image of the source document M is read. The image forming device 12 sequentially forms the source images im in the image memory 43, on the recording sheets. Thus, the plurality of source documents M are sequentially read, and the source images im are respective formed on the recording sheets.

When the source document M to be read has a dog-ear or a missing corner (hereinafter, dog-ear or the like) in the mentioned process, the image im of the source document M also has a missing corner portion. In this embodiment, accordingly, whether the source image im has a missing portion is decided, each time the image reading device 11 reads the source document M. When the shortage value indicating the scale of the missing portion of the source image im is equal to or larger than the first threshold, the first threshold is changed to the second threshold, and further the second threshold is changed to the third threshold, when the shortage value is equal to or larger than the second threshold. Then the source image im is formed by the image forming device 12 as it is, with the shortage value less than the third threshold regarded as permissible. In this embodiment, in contrast, when the shortage value is decided to be equal to or larger than the third threshold, the image forming device 12 is restricted from forming the source image im, and the notice to the effect that the forming of the source image im has been restricted, and/or the page number of the source document M, the image forming of which has been restricted, are displayed on the display device 42. With the image forming apparatus 1 according to this embodiment, therefore, the user can be exempted from the trouble of changing the first threshold to the second threshold or the third threshold, despite the source document having a dog-ear or the like, and form the image as it is on the recording sheet, permitting the dog-ear or the like of the source document smaller than the third threshold. On the other hand, when the image forming apparatus 1 according to this embodiment detects a non-negligible dog-ear or the like, such as the one larger than the third threshold, the image forming apparatus 1 restricts the image forming on the recording sheet.

Hereunder, the reading operation of the source document M, and the decision whether the source image im acquired through the reading operation has a missing portion, will be described.

Figure 4:
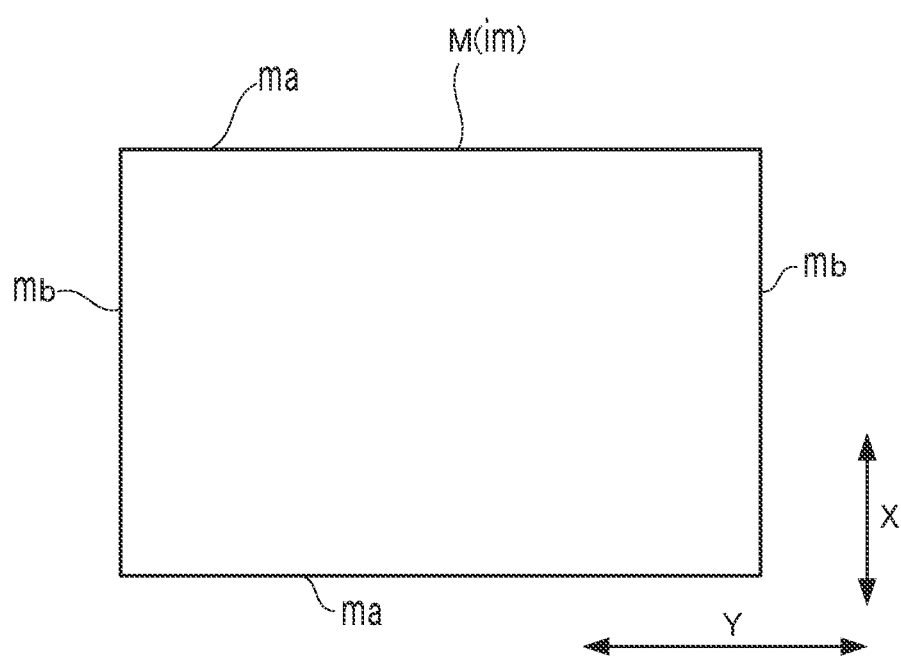
FIG. 4 is a plan view showing a source document to be read by the image reading device.

FIG. 4 is a plan view showing the source document M. As shown in FIG. 4, the source document M is a rectangular sheet, on the surface of which an image including texts, figures, and photos is recorded. The source image im, acquired through the reading of the source document M, also has the same appearance as the source document M, and therefore it will be assumed that FIG. 4 represents both of the source document M and the source image im. This also applies to FIG. 5 and FIG. 6.

The image reading device 11 reads the source document M, and stores the source image im acquired through the reading operation, in the image memory 43. The inclined edge detector 55 detects the edges of the source image im, in other words the four edges constituting the contour of the rectangular source image im, using a known edge detection technique.

For example, the inclined edge detector 55 detects two edges ma extending in the sub scanning direction Y, and two edges mb extending in the main scanning direction X orthogonal to the sub scanning direction Y, as the four edges constituting the contour of the source image im.

Figure 5A:
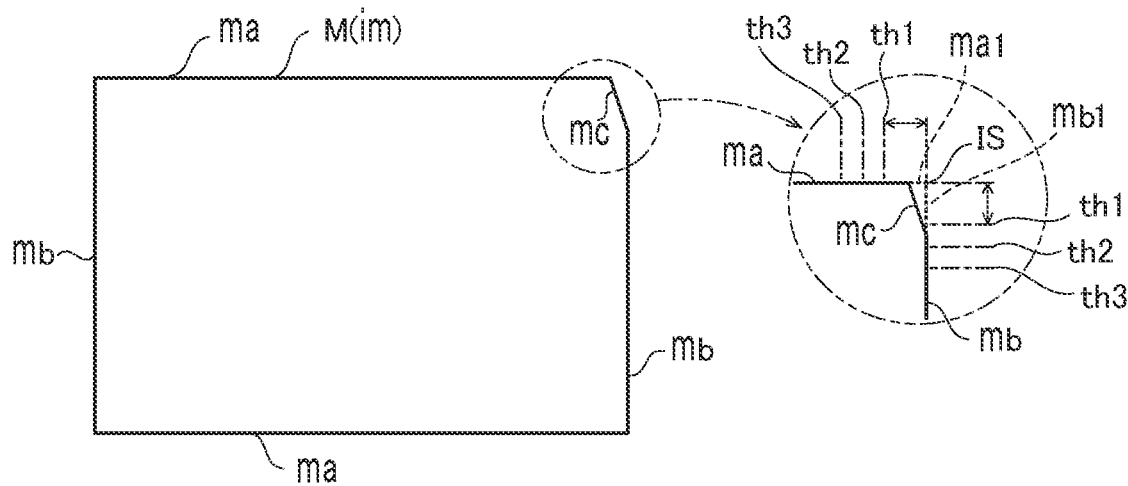
FIG. 5A, FIG. 5B, and FIG. 5C are plan views each showing a source document, a corner of which is folded to the back side not to be read.
Figure 5B:
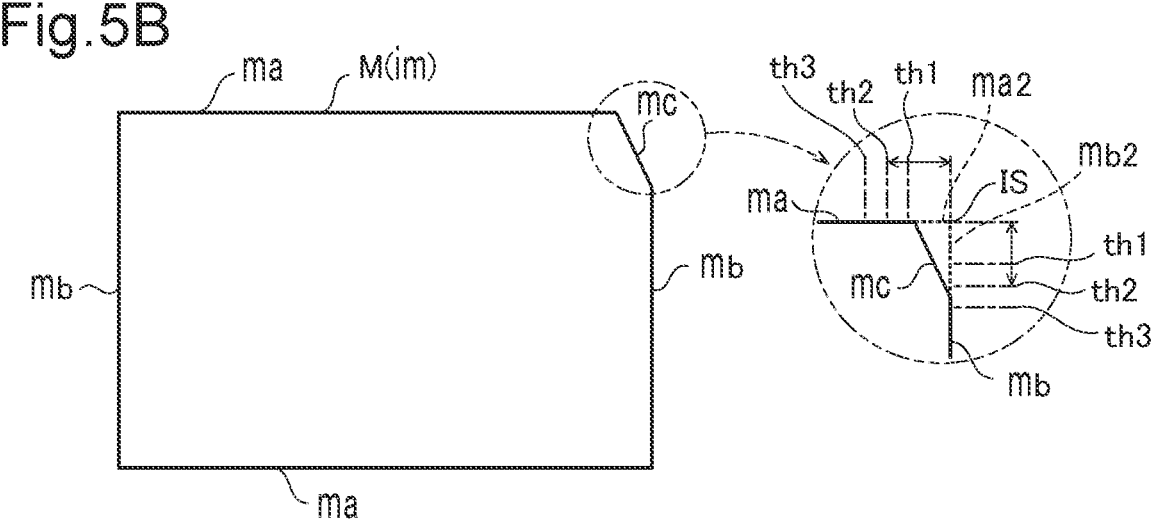
Figure 5C:
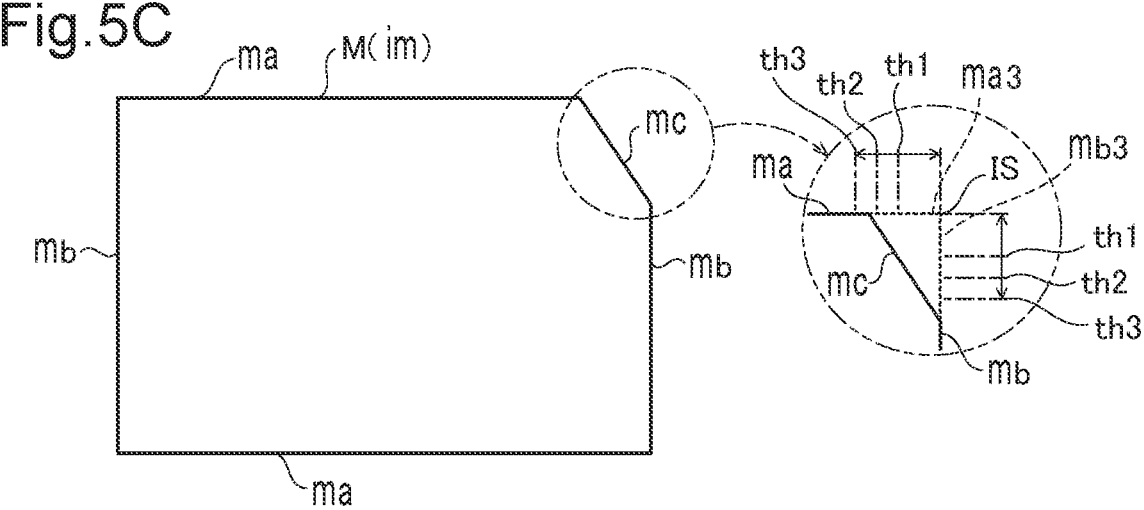

Now, a corner portion of the source document M to be read may be folded to the back side of the source document M, which is the side not to be read, or torn off, for example as shown in FIG. 5A to FIG. 5C. In such a case, the source image im acquired through the reading of the source document M also includes, in addition to the two edges ma and the two edges mb (i.e., four edges), an inclined edge mc, inclined with respect to both of the edge ma and the edge mb. For example, the inclined edge detector 55 detects corner portions from the source image im, formed where the edge ma and the edge mb intersect each other (where the image representing the edge ma and the image representing the edge mb intersect each other, at 90 degrees or an angle close thereto). In the case where four such corners (intersections) have not been detected, the inclined edge detector 55 detects an image representing a line different from both of the edge ma and the edge mb, and intersecting both of the image representing the edge ma and the image representing the edge mb, as an inclined edge mc. Here, a shadow also appears along the inclined edge mc, because of the illumination by the light source 32A of the carriage 32. Accordingly, the decider 56 detects a linear boundary, with respect to which a difference in density between the outer side of the edge and the inner side of the edge of the source image im is larger than a predetermined threshold, for example with the mentioned edge detection technique, as the inclined edge mc.

When the inclined edge detector 55 detects the inclined edge mc, for example as shown in FIG. 5A, the decider 56 calculates, as the shortage value, the respective lengths of the missing edges ma1 and mb1 to the intersection IS, defined when a first edge ma that meets one end of the inclined edge mc, and a second edge mb that meets the other end of the inclined edge mc, out of the edges ma and mb of the source image im, are respectively extended along the direction of the first edge ma and the second edge mb. Then the decider 56 decides whether the length of at least one of the missing edges ma1 and mb1 is equal to or longer than a first threshold th1 (=10 mm). In FIG. 5A, although the length of the missing edge ma1 is shorter than the first threshold th1, the length of the missing edge mb1 is equal to or longer than the first threshold th1 (=10 mm), but shorter than a second threshold th2 (=15 mm).

When the inclined edge detector 55 detects the inclined edge mc, for example as shown in FIG. 5B, the decider 56 calculates, as the shortage value, the respective lengths of the missing edges ma2 and mb2 to the intersection IS, defined when the first edge ma that meets one end of the inclined edge mc, and the second edge mb that meets the other end of the inclined edge mc, out of the edges ma and mb of the source image im, are respectively extended along the direction of the first edge ma and the second edge mb. Then the decider 56 decides whether the length of at least one of the missing edges ma2 and mb2 is equal to or longer than the second threshold th2 (=15 mm). In FIG. 5B, although the length of the missing edge ma2 is shorter than the first threshold th1 (=10 mm), the length of the missing edge mb2 is equal to or longer than the second threshold th2 (=15 mm), but shorter than a third threshold th3 (=20 mm).

When the inclined edge detector 55 detects the inclined edge mc, for example as shown in FIG. 5C, the decider 56 calculates, as the shortage value, the respective lengths of the missing edges ma3 and mb3 to the intersection IS, defined when the first edge ma that meets one end of the inclined edge mc, and the second edge mb that meets the other end of the inclined edge mc, out of the edges ma and mb of the source image im, are respectively extended along the direction of the first edge ma and the second edge mb. Then the decider 56 decides whether the length of at least one of the missing edges ma3 and mb3 is equal to or longer than the third threshold th3 (=20 mm). In FIG. 5C, although the length of the missing edge ma3 is equal to or longer than the second threshold th2 (=15 mm) but shorter than the third threshold th3 (=20 mm), the length of the missing edge mb3 is equal to or longer than the third threshold th3 (=20 mm).

Figure 6A:
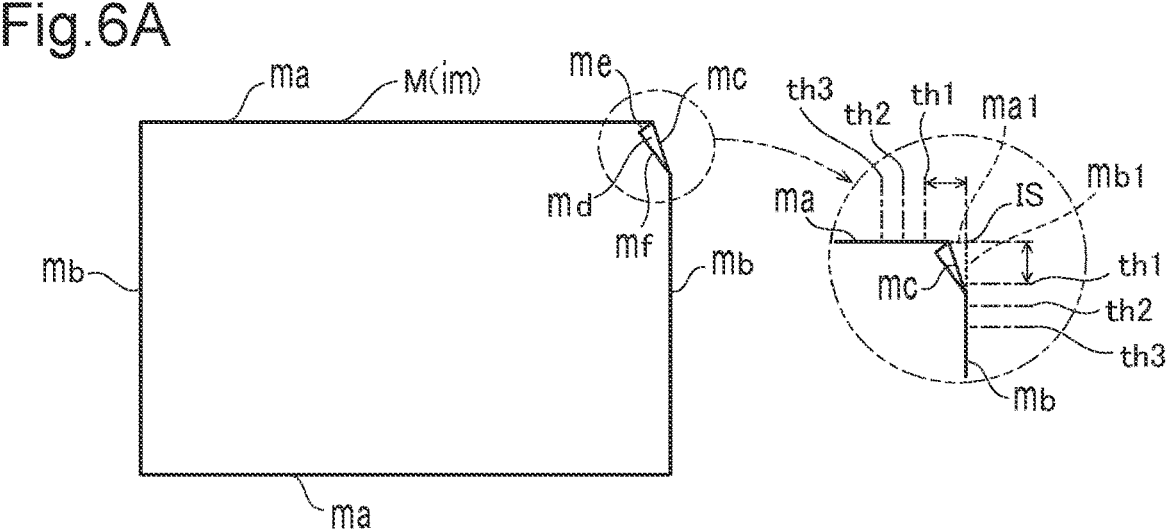
FIG. 6A, FIG. 6B, and FIG. 6C are plan views each showing a source document, a corner of which is folded to the front side to be read.
Figure 6B:
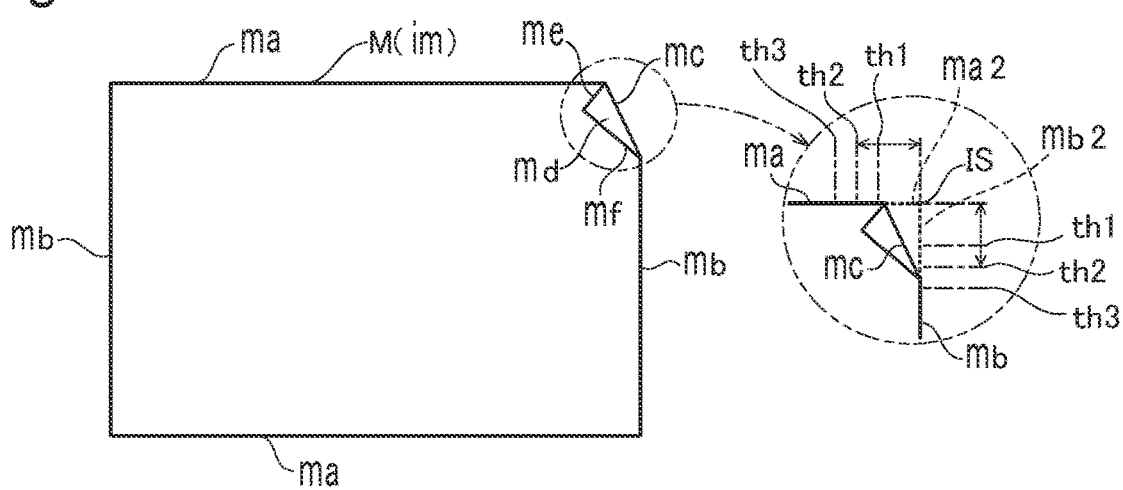
Figure 6C:
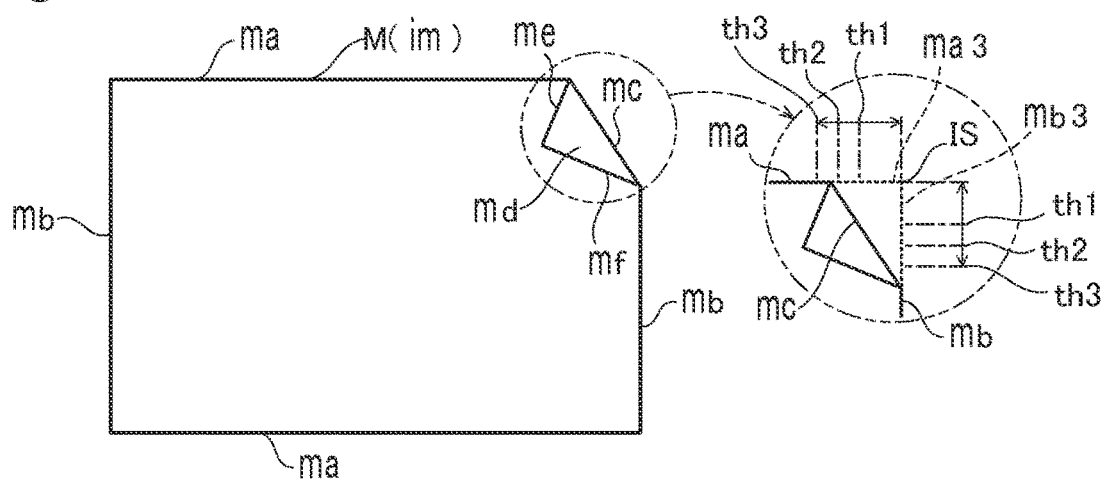

FIG. 6A, FIG. 6B, and FIG. 6C each illustrate the source document M, having a corner portion folded to the front side thereof, which is the side to be read. In this case also, the source image im acquired through the reading of the source document M includes, in addition to the two edges ma and the two edges mb (i.e., four edges), the inclined edge mc, inclined with respect to both of the sub scanning direction Y and the main scanning direction X. Further, a triangular portion md, corresponding to the corner portion of the source document M folded to the front side, appears in the source image im, and two inclined edges me and mf of the triangular portion md appear on the front side. Here, a shadow also appears along the inclined edges mc, me, and mf, because of the illumination by the light source 32A of the carriage 32. Accordingly, the inclined edge detector 55 can detect the inclined edges mc, me, and mf, from the source image im.

When the inclined edge detector 55 detects the inclined edge mc, for example as shown in FIG. 6A, the decider 56 calculates, as the shortage value, the respective lengths of the missing edges ma1 and mb1 to the intersection IS, defined when the first edge ma that meets one end of the inclined edge mc, and the second edge mb that meets the other end of the inclined edge mc, out of the edges ma and mb of the source image im, are respectively extended along the direction of the first edge ma and the second edge mb. Then the decider 56 decides whether the length of at least one of the missing edges ma1 and mb1 is equal to or longer than the first threshold th1 (=10 mm).

When the inclined edge detector 55 detects the inclined edge mc, for example as shown in FIG. 6B, the decider 56 calculates, as the shortage value, the respective lengths of the missing edges ma2 and mb2 to the intersection IS, defined when the first edge ma that meets one end of the inclined edge mc, and the second edge mb that meets the other end of the inclined edge mc, out of the edges ma and mb of the source image im, are respectively extended along the direction of the first edge ma and the second edge mb. Then the decider 56 decides whether the length of at least one of the missing edges ma2 and mb2 is equal to or longer than the second threshold th2 (=15 mm).

When the inclined edge detector 55 detects the inclined edge mc, for example as shown in FIG. 6C, the decider 56 calculates, as the shortage value, the respective lengths of the missing edges ma3 and mb3 to the intersection IS, defined when the first edge ma that meets one end of the inclined edge mc, and the second edge mb that meets the other end of the inclined edge mc, out of the edges ma and mb of the source image im, are respectively extended along the direction of the first edge ma and the second edge mb. Then the decider 56 decides whether the length of at least one of the missing edges ma3 and mb3 is equal to or longer than the third threshold th3 (=20 mm).

Figure 7:
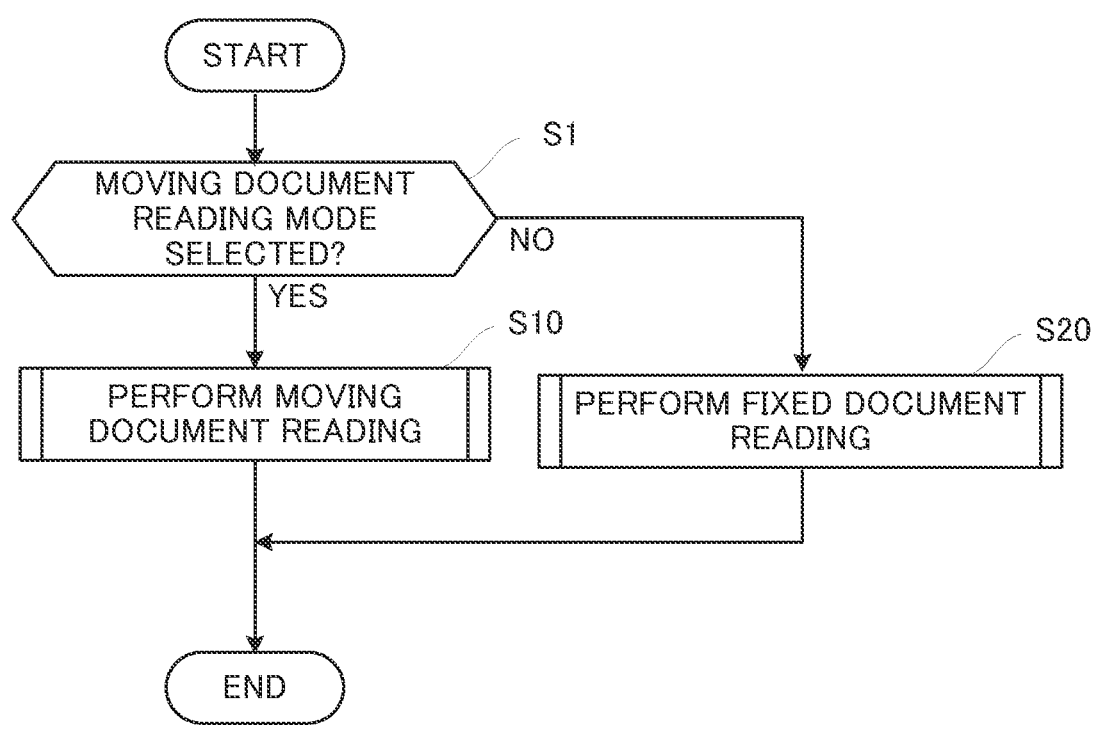
FIG. 7 is a flowchart for explaining a reading operation performed by the image forming apparatus according to the embodiment.

Referring to the flowchart of FIG. 7, the reading operation performed by the image forming apparatus 1 according to this embodiment will be described hereunder.

Figure 8A:
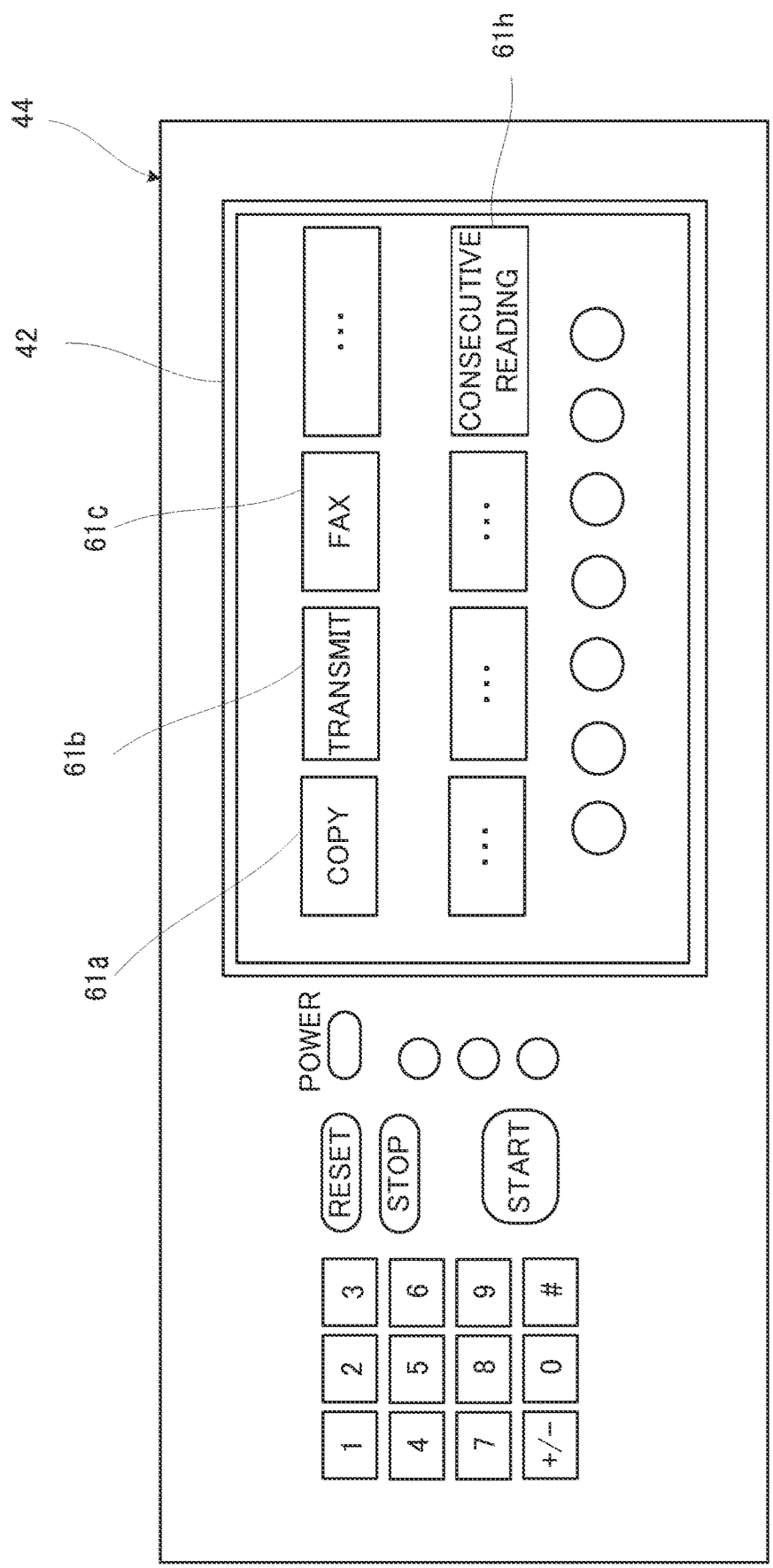

First, the controller 51 causes the display device 42 to display a screen including a plurality of touch keys 61a to 61h, as shown in FIG. 8A. When the user touches the touch key 61h for inputting an instruction to perform consecutive reading, and such touch operation is detected by the touch panel 45, the instruction to perform the consecutive reading is received by the operation receiver 52. When the instruction to perform the consecutive reading is received by the operation receiver 52, the controller 51 starts the reading operation shown in FIG. 7.

The controller 51 causes the display device 42 to display a selection screen for selecting the document reading mode, as shown in FIG. 8B. When a touch operation performed on the touch key 62a, representing the moving document reading mode, is received by the operation receiver 52, the controller 51 decides that the moving document reading mode has been selected (YES at 51). The user places a plurality of source documents M on the document tray 21. When the user touches the touch key 62e for inputting an instruction to start the reading, and such touch operation is detected by the touch panel 45, the instruction to start the reading is received by the operation receiver 52. When the instruction to start the reading is received by the operation receiver 52, the controller 51 starts the moving document reading operation shown in FIG. 7 (S10).

In contrast, when a touch operation performed on the touch key 62b, representing the fixed document reading mode, is received by the operation receiver 52, the controller 51 decides that the fixed document reading mode has been selected (NO at S1). The user places a first one of the plurality of source documents M, on the second platen glass 36. When the user touches the touch key 62e for inputting the instruction to start the reading, and such touch operation is detected by the touch panel 45, the instruction to start the reading is received by the operation receiver 52. When the instruction to start the reading is received by the operation receiver 52, the controller 51 starts the fixed document reading operation shown in FIG. 7 (S20). The details of the fixed document reading operation (S20) will be subsequently described.

Figure 9:
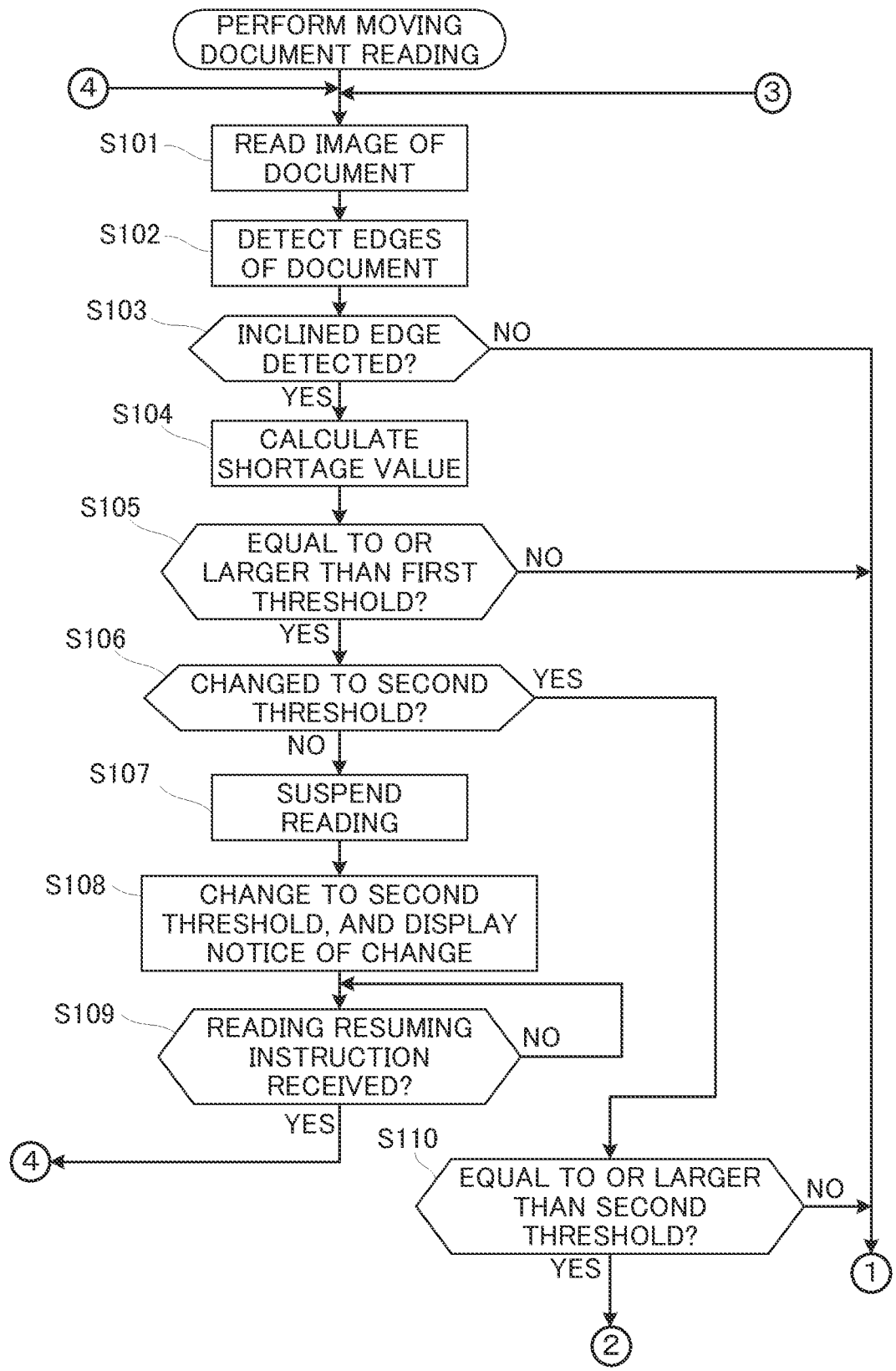
FIG. 9 is a flowchart for explaining a moving document reading operation performed by the image forming apparatus according to the embodiment.
Figure 10:
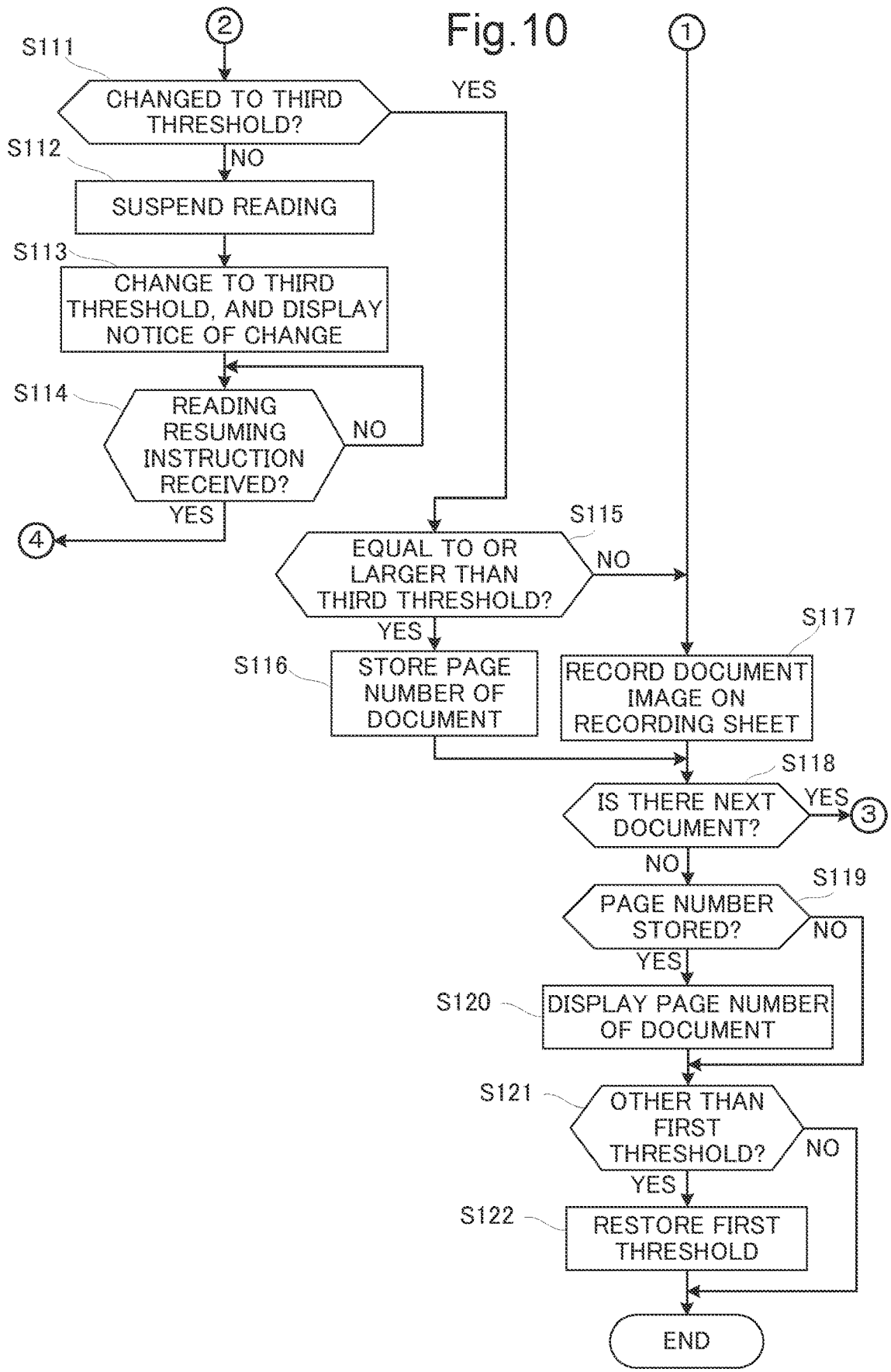
FIG. 10 is a flowchart for explaining the moving document reading operation performed by the image forming apparatus according to the embodiment.

The moving document reading operation (S10) will be described hereunder, with reference to FIG. 9 and FIG. 10. The controller 51 causes the image reading device 11 to read the plurality of source documents M on the document tray 21, one by one (S101). Each time one of the plurality of source documents M is read, the source image im is stored in the image memory 43. The controller 51 stores, together with the source image im acquired through the reading, a page number of the corresponding source document, in the image memory 43.

The inclined edge detector 55 detects the edges of the source image im of each of the source documents M (S102).

Then the inclined edge detector 55 detects whether there is an inclined edge mc, at any of the corner portions of the source image im (S103). In other words, the inclined edge detector 55 decides whether the source image im has the inclined edge mc. When it is decided that the inclined edge detector 55 has not detected the inclined edge mc in the source image im (NO at S103), it can be assumed that the source image im is without the dog-ear or the like, and that the entire area of the source document M has been read. Accordingly, the controller 51 causes the image forming device 12 to form an image based on the source image im stored in the image memory 43, on the recording sheet (S117).

In contrast, when the inclined edge detector 55 detects the inclined edge mc (YES at S103), for example as shown in FIG. 5A and FIG. 6A, the decider 56 calculates, as the shortage value, the respective lengths of the missing edges ma1 and mb1 to the intersection IS, defined when the first edge ma that meets one end of the inclined edge mc, and the second edge mb that meets the other end of the inclined edge mc, out of the edges ma and mb of the source image im, are respectively extended along the direction of the first edge ma and the second edge mb (S104).

Then the decider 56 decides whether the length of at least one of the missing edges ma1 and mb1 is equal to or longer than the first threshold th1 (=10 mm) (S105).

When the decider 56 decides that the lengths of both of the missing edge ma1 and mb1 are shorter than the first threshold th1 (=10 mm) (NO at S105), it can be assumed that the dog-ear or the like in the source image im has been read in a scale smaller than the first threshold. Therefore, the controller 51 causes the image forming device 12 to form the source image im stored in the image memory 43, on the recording sheet (S117).

When the decider 56 decides that the length of at least one of the missing edges ma1 and mb1 is equal to or longer than the first threshold th1 (=10 mm) (YES at S105), the controller 51 decides whether the first threshold th1 has been changed to the second threshold th2 (S106). In this example, it will be assumed that the first threshold th1 is kept unchanged.

Upon deciding that the first threshold th1 has not been changed to the second threshold th2 (NO at S106), the controller 51 suspends the reading operation, as from the source document M that has just been read (S107).

The controller 51 changes the first threshold to the predetermined second threshold (e.g., 15 mm) larger than the first threshold, and causes the display device 42 to display a notice to the effect that the second threshold will be adopted (S108).

The controller 51 then decides whether the reading resuming instruction, to resume reading the source documents M at least including the source document M the reading of which has been suspended, has been received (S109). When the source document M the reading of which has been suspended has a dog-ear, the user corrects the dog-ear. However, when the source document M the reading of which has been suspended has a missing corner, such source document M is used as it is, since the missing corner is unable to be restored. Then a series of source documents M, subsequent to the source document M the reading of which was suspended, are again placed on the document tray 21.

When the reading resuming instruction is received by the operation device 44 (YES at S109), the operation returns to S101, where the image reading device 11 again reads the source document M, and the source image im is stored in the image memory 43. The inclined edge detector 55 detects whether the source image im includes the inclined edge mc at any of the corner portions (S102). When the inclined edge detector 55 detects the inclined edge mc (YES at S103), the decider 56 calculates, as the shortage value, the respective lengths of the missing edges to the intersection IS, defined when the first edge ma that meets one end of the inclined edge mc, and the second edge mb that meets the other end of the inclined edge mc, out of the edges ma and mb of the source image im, are respectively extended along the direction of the first edge ma and the second edge mb (S104). The decider 56 decides whether the length of at least one of the missing edges is equal to or longer than the first threshold th1 (S105), and decides, when the length is equal to or longer than the first threshold th1 (YES at S105), whether the first threshold th1 has been changed to the second threshold th2 (S106). Since the shifting to the second threshold th2 was already stored in the image memory 43 at S108, the controller 51 decides that the second threshold th2 is now valid (YES at S106). Then the decider 56 decides whether the length of at least one of the missing edges is equal to or longer than the second threshold th2 (=15 mm) (S110).

When the decider 56 decides that the lengths of the respective missing edges are both shorter than the second threshold th2 (=15 mm) (NO at S110), it means that the dog-ear or the like in the source image im has been read in a scale smaller than the second threshold. Therefore, the controller 51 causes the image forming device 12 to form the source image im stored in the image memory 43, on the recording sheet (S117).

When the decider 56 decides that the length of at least one of the missing edges is equal to or longer than the second threshold th2 (=15 mm) (YES at S110), the controller 51 decides whether the second threshold th2 has been changed to the third threshold th3 (S111). In this example, it will be assumed that the first threshold th1 has been changed to the second threshold th2, but not yet to the third threshold th3.

Upon deciding that the second threshold th2 has not been changed to the third threshold th3 (NO at S111), the controller 51 suspends the reading operation, as from the source document M that has just been read (S112).

The controller 51 changes the second threshold to the predetermined third threshold (e.g., 20 mm) larger than the second threshold, and causes the display device 42 to display a notice to the effect that the third threshold will be adopted (S113).

The controller 51 then decides whether the reading resuming instruction, to resume reading the source documents M at least including the source document M the reading of which has been suspended, has been received (S114). When the source document M the reading of which has been suspended has a dog-ear, the user corrects the dog-ear. However, when the source document M the reading of which has been suspended has a missing corner, such source document M is used as it is, since the missing corner is unable to be restored. Then a series of source documents M, subsequent to the source document M the reading of which was suspended, are again placed on the document tray 21.

When the reading resuming instruction is received by the operation device 44 (YES at S114), the operation returns to S101, where the image reading device 11 again reads the source document M, and the source image im is stored in the image memory 43. The inclined edge detector 55 detects whether the source image im includes the inclined edge mc at any of the corner portions (S102). When the inclined edge detector 55 detects the inclined edge mc (YES at S103), the decider 56 calculates, as the shortage value, the respective lengths of the missing edges to the intersection IS, defined when the first edge ma that meets one end of the inclined edge mc, and the second edge mb that meets the other end of the inclined edge mc, out of the edges ma and mb of the source image im, are respectively extended along the direction of the first edge ma and the second edge mb (S104). The decider 56 decides whether the length of at least one of the missing edges is equal to or longer than the first threshold th1 (S105), and decides, when the length is equal to or longer than the first threshold th1 (YES at S105), whether the first threshold th1 has been changed to the second threshold th2 (S106). Since the shifting to the second threshold th2 at S108, and also the shifting to the third threshold th3 at S113 are already stored in the image memory 43, the controller 51 decides that the second threshold th2 is valid (YES at S106), and further decides, when the length of the missing edge is equal to or longer than the second threshold th2 (YES at S110), that the third threshold th3 has now been adopted (YES at S111). Then the decider 56 decides whether the length of at least one of the missing edges is equal to or longer than the third threshold th3 (=20 mm) (S115). In the case of the example shown in FIG. 5C, the decider 56 decides that the missing edge mb3, out of the missing edges ma3 and mb3 of the source image im, is equal to or longer than the third threshold th3 (YES at S115), and the controller 51 stores the page number of the corresponding source document M, in the image memory 43 (S116).

When the decider 56 decides that the lengths of the respective missing edges are both shorter than the third threshold th3 (=20 mm) (NO at S115), it means that the dog-ear or the like in the source image im has been read in a scale smaller than the third threshold. Therefore, the controller 51 causes the image forming device 12 to form the image based on the source image im stored in the image memory 43, on the recording sheet (S117).

After S116, or after S117, the controller 51 decides whether there are one or more next source documents (S118). When the presence of the source document M on the document tray 21 is detected by a non-illustrated document sensor provided on the document tray 21, the controller 51 decides that there are one or more next source documents (YES at S118), and returns to S101.

In contrast, when the non-illustrated document sensor provided on the document tray 21 has not detected the source document M on the document tray 21, the controller 51 decides that no next source document is left (NO at S118), and decides whether the page numbers are stored in the image memory 43 (S119). Upon deciding that the page numbers are stored (YES at S119), the controller 51 causes the display device 42 to display the page number of the source document M, the image of which has not been formed by the image forming device 12 on the recording sheet, in other words the page number of the source document M, from which the dog-ear or the like of a scale equal to or larger than the third threshold th3 was detected, out of the plurality of source documents M (S120).

The controller 51 decides whether the first threshold th1 has been changed to the second threshold th2 or the third threshold th3 (S121). In the case where either of the latter thresholds is valid (YES at S121), the controller restores the first threshold th1 (S122), and finishes the operation. In the case where the first threshold th1 is kept unchanged (NO at S121), the controller 51 finishes the operation.

Figure 11:
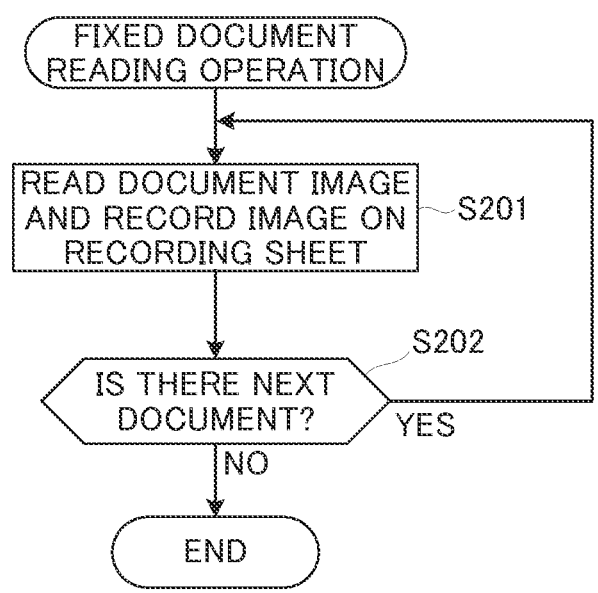
FIG. 11 is a flowchart for explaining a fixed document reading operation performed by the image forming apparatus according to the embodiment.

The fixed document reading operation (S20) shown in FIG. 7 will now be described, with reference to FIG. 11. FIG. 11 is a flowchart for explaining the fixed document reading operation performed by the image forming apparatus according to this embodiment. Here, it will be assumed that the user has placed the first one of the plurality of source documents M, on the second platen glass 36. The controller 51 causes the scanner unit 30 to read the source document M placed on the second platen glass 36, and causes the image forming device 12 to form the source image im read by the scanner unit 30, on the recording sheet (S201). After 5201, the controller 51 decides whether there is a next source document (S202). When the user places the next source document M on the second platen glass 36, and a non-illustrated document sensor provided on the document table 37 detects the source document M on the second platen glass 36, the controller 51 decides that there is a next source document (YES at S202). When the user touches the touch key 62e shown in FIG. 8B, and such touch operation is detected by the touch panel 45, the controller 51 causes the scanner unit 30 to read the second source document M placed on the second platen glass 36, and causes the image forming device 12 to form the source image im read by the scanner unit 30, on the recording sheet (S201). Upon deciding that there is no next source document (NO at S202), or when the user touches a non-illustrated finish button, the controller 51 finishes the operation.

Figure 12:
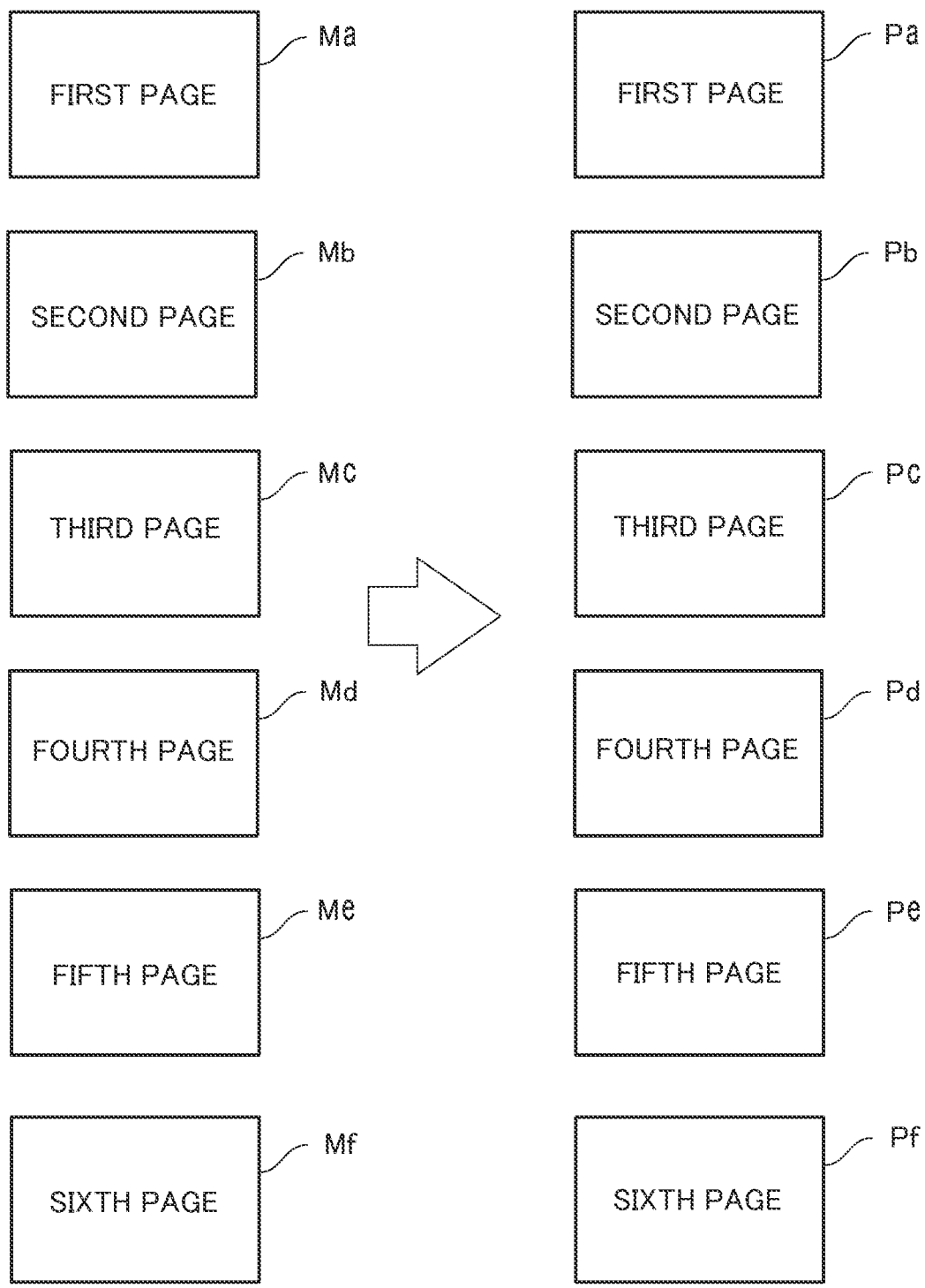
FIG. 12 is a schematic drawing showing six source documents read by the image reading device, and the recording sheets on which the respectively corresponding images have been recorded.

Under the configuration according to this embodiment, when none of six source documents Ma to Mf placed on the document tray 21 have a dog-ear, or a missing corner, for example as shown in FIG. 12, six recording sheets Pa to Pf, on which the respective images of the source documents Ma to Mf have been formed, are outputted from the image forming apparatus 1.

Figure 13:
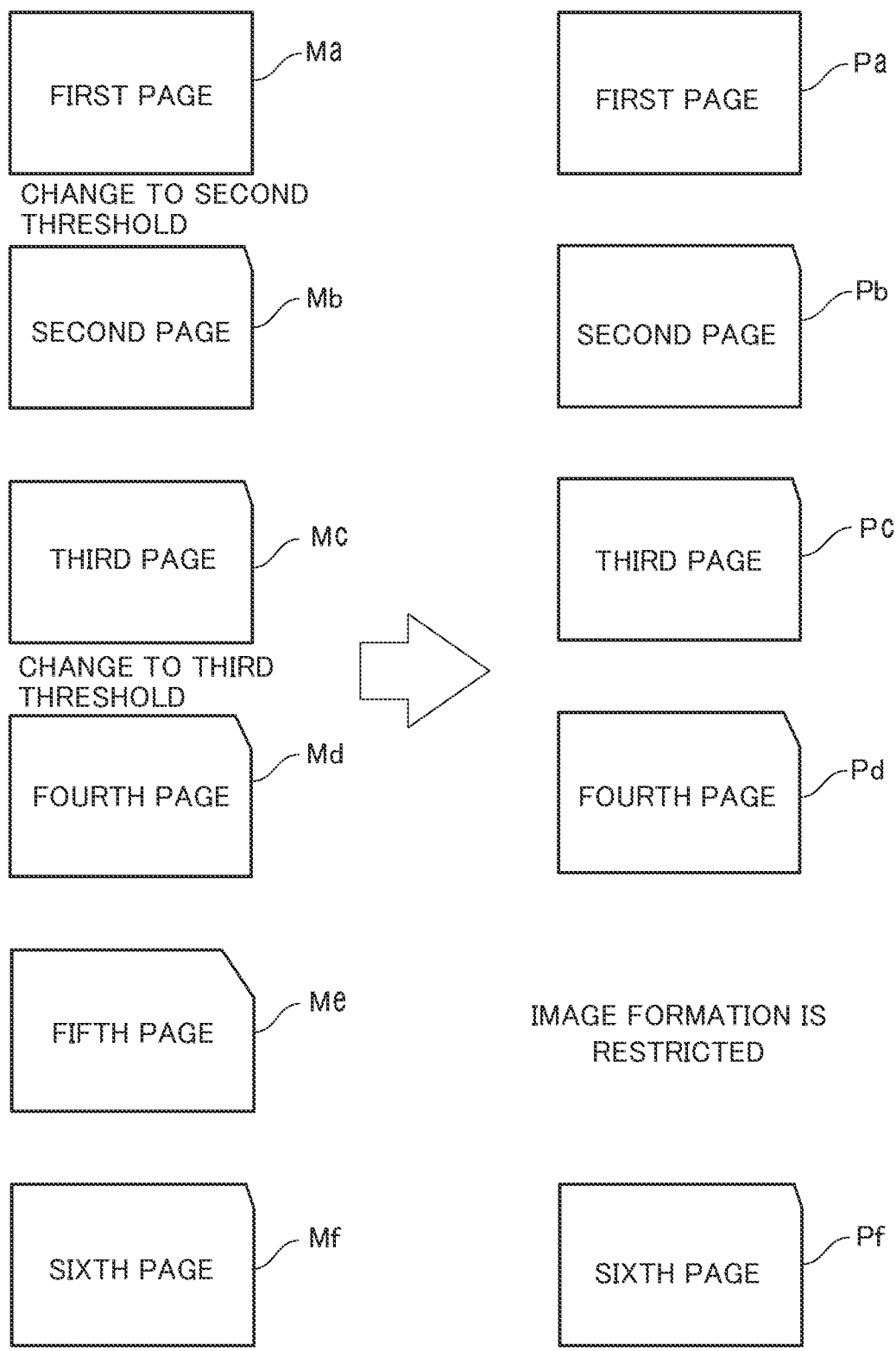
FIG. 13 is a schematic drawing showing six source documents read by the image reading device, and five recording sheets on each of which the corresponding image has been recorded.

When the six source documents Ma to Mf are placed on the document tray 21, and the first source document Ma is without the dog-ear or the like, as shown in FIG. 13, the recording sheet Pa on which the image of the source document Ma has been recorded is outputted from the image forming apparatus 1.

The second source document Mb has a missing corner of a scale equal to or larger than the first threshold th1 but smaller than the second threshold th2, and therefore the reading is suspended, at the second source document Mb. The controller 51 changes the first threshold th1 to the second threshold th2, and causes the display device 42 to display the notice to the effect that the second threshold th2 has been adopted. Then the user again places the second to the sixth source documents Mb to Mf on the document tray 21. In this case, since the missing corners (or dog-ear) of the second source document Mb and the third source document Mc are of a scale smaller than the second threshold th2, the two recording sheets Pb and Pc, on which the respective source images im of the source documents Mb and Mc are recorded, are outputted from the image forming apparatus 1.

The fourth source document Md has a missing corner of a scale equal to or larger than the second threshold th2 but smaller than the third threshold th3, and therefore the reading is suspended, at the fourth source document Md. The controller 51 changes the second threshold th2 to the third threshold th3, and causes the display device 42 to display the notice to the effect that the third threshold th3 has been adopted. Then the user again places the fourth to the sixth source documents Md to Mf on the document tray 21. In this case, since the missing corner (or dog-ear) of the fourth source document Md is of a scale smaller than the third threshold th3, the recording sheet Pd, on which the source images im of the source document Md is recorded, is outputted from the image forming apparatus 1.

The fifth source document Me has a missing corner of a scale equal to or larger than the third threshold th3, and therefore the image formation based on the source image im of the fifth source document Me is restricted.

The sixth source document Mf only has the dog-ear or the like of a scale smaller than the third threshold th3 (more accurately, smaller than the second threshold th2), and therefore the recording sheet Pf, on which the source images im of the sixth source document Mf is recorded, is outputted from the image forming apparatus 1.

According to the foregoing embodiment, the controller 51 (ii) causes the image reading device 11 to suspend the reading of the source document, when the decider 56 decides that the shortage value of the source image is equal to or larger than the first threshold. Then the controller 51 causes the display device 42 to display the notice to the effect that the first threshold is changed to the predetermined second threshold larger than the first threshold. Then, in the case where the reading resuming instruction, to resume reading the source documents at least including the source document the reading of which has been suspended, is received by the operation device 44, the controller 51 stores the source image, or causes the image forming device 12 to form the source image, when the decider 56 decides that the shortage value of the source image is less than the second threshold. When there are one or more next source documents, the controller 51 causes the image reading device 11 to read the next source documents. In other words, when a dog-ear or a missing corner of the source document is of a scale equal to or larger than the first threshold, such a portion is detected as the dog-ear or the like, and the reading of the source document, the reading of which was suspended, is resumed after the criterion for deciding the dog-ear or the like is loosened to the second threshold from the first threshold. Accordingly, in the reading operation resumed after the dog-ear or the like of the source document was detected, a dog-ear or the like, of a scale similar to that of the first detected dog-ear or the like, is kept from being detected.

Such an arrangement prevents a situation where, in the reading operation resumed after the dog-ear or the like of the source document was detected, the reading is interrupted owing to detection of the dog-ear or the like, of a scale similar to that of the dog-ear or the like that was already detected. Accordingly, the user can be exempted from the trouble of correcting the dog-ear of the documents, and the reading operation can be quickly performed, without time and effort. In addition, even during the reading operation resumed after the dog-ear or the like of the source document was detected, the dog-ear or the like can still be detected, provided that the dog-ear or the like is of a scale equal to or larger than the second threshold, and therefore the detection of the dog-ear or the like, of a scale equal to or larger than the second threshold, can be effectively continued.

The missing portion detector 54 includes the inclined edge detector 55 that detects the edges of the source image, and also detects whether the source image includes an inclined edge at any of the corner portions, each time the image reading device 11 reads the plurality of source documents one by one, and decides that the source image has a missing corner, when the inclined edge detector 55 detects the inclined edge. When the inclined edge detector 55 detects the inclined edge, the decider 56 calculates, as the shortage value, the respective lengths of the missing edges to the intersection defined when the first edge that meets one end of the inclined edge, and the second edge that meets the other end of the inclined edge, out of the edges of the source image, are respectively extended along the direction of the first edge and the second edge, and decides whether the length of at least one of the missing edges is equal to or longer than the first threshold. The controller 51 (ii) causes the image reading device 11 to suspend the reading of the source document, when the decider 56 decides that the length of at least one of the missing edges is equal to or longer than the first threshold. Then the controller 51 causes the display device 42 to display the notice to the effect that the first threshold is changed to the second threshold. In the case where the reading resuming instruction, to resume reading the source documents at least including the source document the reading of which has been suspended, is received by the operation device 44, the controller 51 stores the source image, or causes the image forming device 12 to form the source image, when the decider 56 decides that the respective lengths of the missing edges are both shorter than the second threshold. When there are one or more next source documents, the controller 51 causes the image reading device 11 to read the next source documents. Such an arrangement enables the dog-ear or the like of the source document to be effectively detected, when the length of the missing edge is equal to or longer than the first threshold. Once the dog-ear or the like of the source document has been detected, the reading of the source document, with respect to which the reading was suspended, is resumed under the second threshold, loosened from the first threshold in terms of the criterion for deciding the dog-ear or the like. Therefore, in the reading operation resumed after the dog-ear or the like of the source document was detected, a dog-ear or the like, of a scale similar to that of the first detected dog-ear or the like, can be effectively kept from being detected.

In the case where the second threshold remains valid, after the image reading device 11 has finished the sequential reading of the images of the plurality of source documents, the controller 51 restores the first threshold. Such an arrangement enables the dog-ear or the like of the source document to be effectively detected, when the length of the missing edge is equal to or longer than the first threshold, in the reading operation newly performed by the image reading device 11. In addition, the user is exempted from the trouble or restoring the first threshold.

In the moving document reading mode, in which the image reading device 11 reads the source documents delivered from the document feeding device one by one, with the scanner unit 30 through the first platen glass 31, the controller 51 causes the missing portion detector 54 to detect a missing corner in the source image. In the moving document reading mode, a dog-ear or the like is prone to be incurred, while the plurality of source documents are being transported by the document feeding device. Accordingly, the dog-ear or the like can be efficiently detected, by performing the detection in the moving document reading mode in which the dog-ear or the like is likely to appear. In contrast, in the fixed document reading mode in which the image reading device 11 reads the source document placed on the second platen glass 36 with the scanner unit 30, the controller 51 keeps the missing portion detector 54 from detecting a missing corner of the source image. Since the user places each single source document on the second platen glass 36, in the fixed document reading mode, a dog-ear or the like of the source document is barely likely to be incurred. Therefore, the detecting operation of the dog-ear or the like of the source document can be skipped, in the fixed document reading mode in which the dog-ear or the like of the source document is barely likely to be incurred.

Further, the controller 51 (iii) causes the image reading device 11 to suspend the reading of the source document, when the decider 56 decides that the shortage value of the source image is equal to or larger than the first threshold. Then the controller 51 causes the display device 42 to display the notice to the effect that the second threshold is changed to the predetermined third threshold larger than the second threshold. Then, in the case where the reading resuming instruction, to resume reading the source documents at least including the source document the reading of which has been suspended, is received by the operation device 44, the controller 51 stores the source image, or causes the image forming device 12 to form the source image, when the decider 56 decides that the shortage value of the source image is less than the third threshold. When there are one or more next source documents, the controller 51 causes the image reading device 11 to read the next source documents. Accordingly, when a dog-ear or a missing corner of the source document is of a scale equal to or larger than the second threshold, such a portion is detected as the dog-ear or the like, and the reading of the source document, the reading of which was suspended, is resumed after the criterion for deciding the dog-ear or the like is loosened to the third threshold from the second threshold. Therefore, in the reading operation resumed after the dog-ear or the like of the source document was detected, a dog-ear or the like, of a scale similar to the dog-ear or the like detected earlier, is kept from being detected.

When the decider 56 decides that the shortage value of the source image is equal to or larger than the third threshold, the controller 51 restricts the storage of the source image, or restricts the image forming device 12 from forming the source image. When there are one or more next source documents, the controller 51 causes the image reading device 11 to read the next source documents. Then, when the image reading device 11 finishes the sequential reading of the images of the plurality of source documents, the controller 51 causes the display device 42 to display the page number of the source image that was restricted. Thus, when the source image has a large missing portion, such that the shortage value is decided to be equal to or larger than the third threshold, in other words when the source document has a remarkable dog-ear or the like, the storage or image forming of the source image is restricted, and the user can be made aware of the page number of the source image, the storage or image forming of which was restricted, after the sequential reading of all the source documents is finished.

Further, when the moving document reading operation is selected, the image processor 53 may optimize the density, contrast, or resolution of the source image im read by the image reading device 11, to facilitate the detection of the edges of the source document M.

In the case of the existing image forming apparatus, incorporated with the known dog-ear detection technique, the reading of the source document is suspended, when the dog-ear of the source document is detected while the plurality of source documents are sequentially drawn out from the tray. The user corrects the dog-ear of the source document, sets the source document again on the tray, and causes the image forming apparatus to resume the reading. Such an operation prevents the source image with a missing corner from being recorded on the recording sheet. However, in case the dog-ear occurs on a plurality of source documents, the reading is suspended, and the user has to correct the dog-ear and reset the source document, each time the dog-ear of the source document is detected. Thus, the reading operation is frequently interrupted.

In addition, when the source document has a missing corner (e.g., when the corner is torn off), instead of the dog-ear, such a missing corner is unable to be fixed. With the existing image forming apparatus, therefore, the reading of the source document continues to be suspended once the missing corner of the source document is detected, and the reading operation becomes unable to be completed.

Accordingly, the existing image forming apparatus is configured such that the dog-ear detection function can be cancelled, when a missing corner is detected in the source document, so that the reading of the source documents can be resumed. In this case, however, the dog-ear of the source document is no longer detected after the reading operation is resumed, and therefore many images with a missing corner may be recorded on the recording sheet.

In contrast, with the configuration according to the foregoing embodiment, the reading operation is continued without being suspended, when a dog-ear or the like, of the similar scale to the dog-ear or the like detected earlier, is detected during the reading operation resumed after the dog-ear or a missing corner was once detected. Therefore, the interruption of the reading operation can be prevented.

Figure 14:
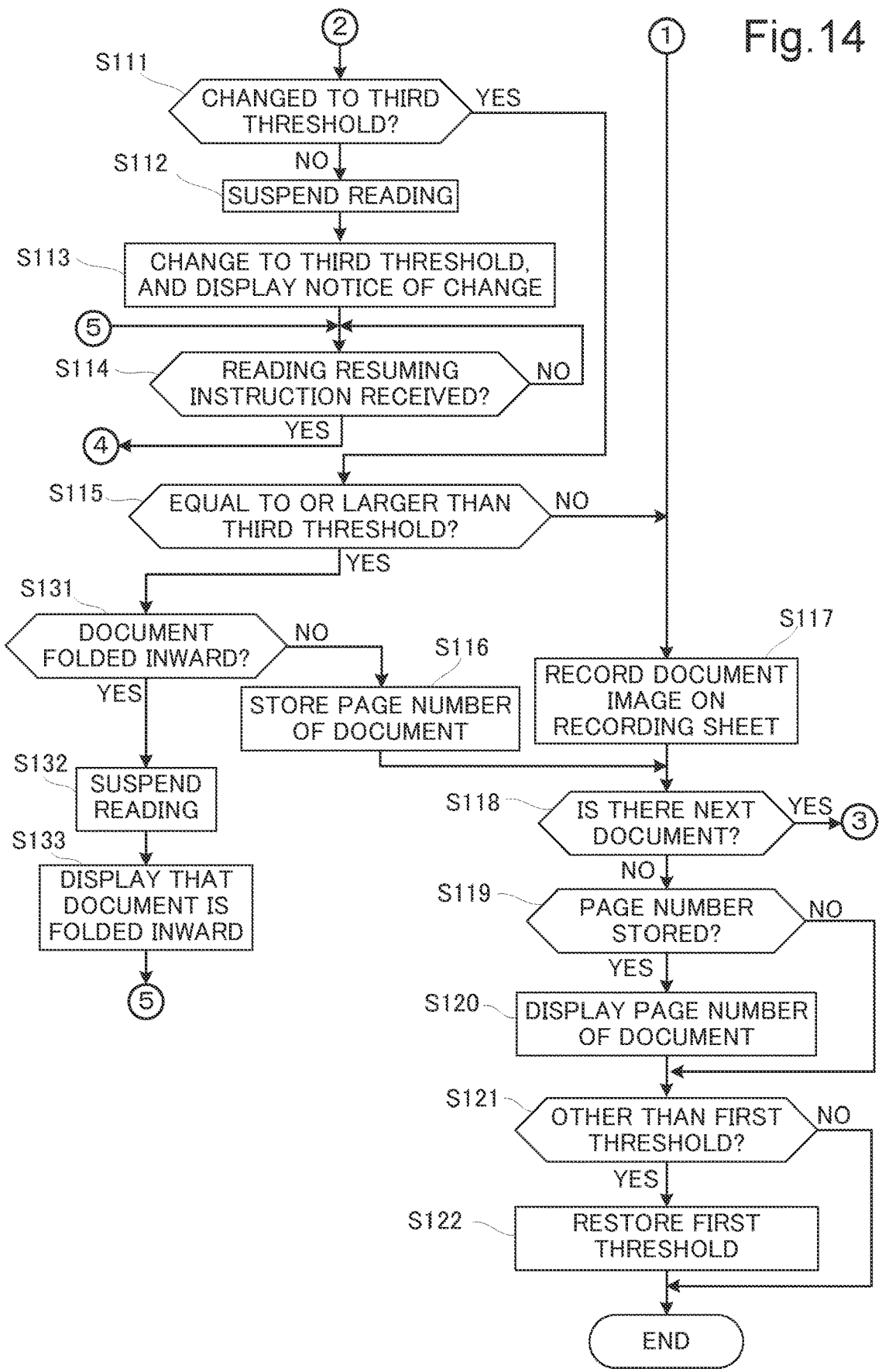
FIG. 14 is a flowchart for explaining the moving document reading operation according to a variation.

Hereunder, the image forming apparatus 1 according to a variation will be described. FIG. 14 is a flowchart for explaining the moving document reading operation according to the variation. The moving document reading operation according to the variation shown in FIG. 14 is different from the moving document reading operation according to the foregoing embodiment shown in FIG. 10, in additionally including steps S131 to S133. Therefore, only these steps S131 to S133 will be described.

When the decider 56 decides that the shortage value of the source image im (length of at least one of the missing edges calculated from the edges ma and mb, and the inclined edge mc of the source image im, as in the foregoing embodiment) is equal to or larger than the third threshold th3 (YES at S115), the missing portion detector 54 detects whether the source document M is folded inward (S131). In other words, the missing portion detector 54 detects whether the missing corner of the source image im is resultant from the inward folding of the source document M.

To be more detailed, when the source document M is folded inward as shown in FIG. 6A, FIG. 6B, and FIG. 6C, the triangular portion md is formed because of the corner portion of the source document M being folded to the front side along the inclined edge mc, and the two inclined edges me and mf of the triangular portion md appear on the front side. A shadow also appears along each of the inclined edges mc, me, and mf, because of the illumination by the light source 32A of the carriage 32, and therefore the inclined edge detector 55 can detect the inclined edges mc, me, and mf, from the source image im. Upon detecting at least one of the inclined edges me and mf, the inclined edge detector 55 detects that the source document M is folded inward. In other words, missing portion detector 54 detects that the missing corner of the source image im is resultant from the inward folding of the source document M.

When the missing portion detector 54 detects that the missing corner of the source image im is resultant from the inward folding of the source document M (YES at S131), the controller 51 causes the image reading device 11 to suspend the reading of the source documents M (S132). In contrast, when the missing portion detector 54 detects that the missing corner of the source image im is not resultant from the inward folding of the source document M (NO at S131), the controller 51 proceeds to S116.

Then the controller 51 causes the display device to display a notice to the effect that the source document is folded inward (S133). Here, it will be assumed that the user corrects the inward folding of the source document M, the reading of which has been suspended, and a series of source documents M subsequent thereto are again placed on the document tray 21, by the user.

After S133, the controller 51 proceeds to S114, where the controller 51 decides whether the reading resuming instruction, to resume the reading of the source documents M, at least including the source document M the reading of which was suspended, has been received (S114). When the reading resuming instruction is received by the operation device 44 (YES at S114), the controller 51 proceeds to 5101, to cause the image reading device 11 to again read the source document M (S101), and stores the source image im in the image memory 43. The inclined edge detector 55 detects whether the source image im has an inclined edge mc at any of the corner portions (S103). When the inclined edge detector 55 detects the inclined edge mc (YES at S103), the decider 56 calculates, as the shortage value, the respective lengths of the missing edges to the intersection IS, defined when the first edge ma that meets one end of the inclined edge mc, and the second edge mb that meets the other end of the inclined edge mc, out of the edges ma and mb of the source image im, are respectively extended along the direction of the first edge ma and the second edge mb (S104). The decider 56 decides whether the length of at least one of the missing edges is equal to or longer than the first threshold th1 (S105), and decides, when the length is equal to or longer than the first threshold th1 (YES at S105), whether the first threshold th1 has been changed to the second threshold th2 (S106). Since the shifting to the second threshold th2 at S108, and the shifting to the third threshold th3 at S113, are already stored in the image memory 43, the controller 51 decides that the second threshold th2 is now valid (YES at S106), or decides, when the length is equal to or longer than the second threshold th2 (YES at S110), that the third threshold th3 is now valid (YES at S111). The decider 56 decides whether the length of at least one of the missing edges is equal to or longer than the third threshold th3 (=20 mm) (S115). The steps subsequent to S116 are the same as those of the foregoing embodiment, and therefore the description thereof will not be repeated.

With the configuration according to the variation, although a dog-ear of the source document M, of a scale equal to or larger than the third threshold th3, is detected, the user can correct the inward folding of the source document M, provided that the missing corner of the source image im is resultant from the inward folding of the source document M, and reset the source documents M at least including the inwardly folded source document M on the document tray 21, to continue with the reading operation. Thus, the dog-ear of a remediable level can be efficiently detected, and the source documents that may be regarded as unreadable can be reduced.

Although the first threshold, the second threshold, and the third threshold are respectively predetermined as 10 mm, 15 mm, and 20 mm, in the foregoing embodiment and variation, any desired values may be adopted, without limitation to the above. For example, the second threshold or the third threshold may be set to ten times of the first threshold.

According to the foregoing embodiment and the variation, the controller restricts the storage of the source image, or restricts the image forming device 12 from forming the source image, when the decider 56 decides that the shortage value of the source image is equal to or larger than the third threshold. Instead, the controller may restrict the storage of the source image, or restrict the image forming device 12 from forming the source image, when the decider 56 decides that the shortage value of the source image is equal to or larger than the second threshold. In this case, when the source image has a large missing portion, such that the shortage value is decided to be equal to or larger than the second threshold, in other words when the source document has a remarkable dog-ear or the like, the storage or image forming of the source image is restricted, and the user can be made aware of the page number of the source image, the storage or image forming of which was restricted, after the sequential reading of all the source documents is finished.

Here, the controller 51 may adopt a blank distance, corresponding to the width of the peripheral margin space along the four sides of the rectangular source document, as one of the first threshold, the second threshold, and the third threshold. More specifically, the controller 51 may identify an effective region on the source image, where characters or figures are recorded, by performing a known optical character recognition (OCR) with respect to each of the source images im. For example, the controller 51 may identify the effective region, surrounded by straight lines parallel to the respective edges of the rectangular source image detected by the inclined edge detector 55, at the position spaced from the edges by the blank distance corresponding to the margin space where no characters or figures are recorded, and store the coordinate representing the effective region with respect to the source image im. Then the controller 51 causes the image forming device 12 to form the image of the effective region of the rectangular source document M, on the recording sheet. Thus, the controller 51 may adopt the blank distance identified as above, as one of the first threshold, the second threshold, and the third threshold. For example, when the source image has a rectangular shape, the controller 51 adopts a shortest distance, among distances between respective peripheral edges of the source image and the effective region, as the third threshold. The determination unit 56 makes the above determination using the third threshold.

According to the foregoing embodiment and the variation, when the inclined edge detector 55 detects the inclined edge mc, the decider 56 calculates, as the shortage value, the respective lengths of the missing edges ma1 and mb1 to the intersection IS, defined when the first edge ma that meets one end of the inclined edge mc, and the second edge mb that meets the other end of the inclined edge mc, are respectively extended along the direction of the first edge ma and the second edge mb. However, a different method may be adopted. For example, the decider 56 may superpose the source image im, on a frame image of a rectangular shape that serves as the reference, in the same size, by a known pattern matching technique, and calculate the horizontal length and the vertical length of the missing corner of the source image im, in the rectangular frame image, as the lengths of the missing edges.

Further, the configurations and processings described in the foregoing embodiments with reference to FIG. 1 to FIG. 14 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   an image reading device that sequentially reads an image of each of a plurality of source documents;
   a display device;
   an operation device to be operated by a user;
   an image forming device that forms the image of each of the plurality of source documents read by the image reading device, on a recording sheet;
   a control device including a processor and functioning, through the processor executing a control program, as:
   a missing portion detector that detects whether the source image has a missing corner, each time the image reading device reads the plurality of source documents one by one, as the source image;
   a decider that decides whether a shortage value, indicating a scale of the missing corner in the source image, is equal to or larger than a first threshold, when the missing portion detector detects the missing corner in the source image; and
   a controller that (i) stores the source image, or causes the image forming device to form the source image, when the decider decides that the shortage value of the source image is smaller than the first threshold, and causes, when there are one or more next source documents, the image reading device to read the next source documents, and (ii) causes the image reading device to suspend the reading, when the decider decides that the shortage value of the source image is equal to or larger than the first threshold, causes the display device to display a notice that the first threshold is changed to a predetermined second threshold larger than the first threshold, stores the source image, or causes the image forming device to form the source image, when a reading resuming instruction, to resume reading the source documents at least including the source document, the reading of which has been suspended, is received by the operation device, and when the decider decides that the shortage value of the source image is smaller than the second threshold, and causes, when there are one or more next source documents, the image reading device to read the next source documents.

2. The image forming apparatus according to claim 1,
wherein the missing portion detector includes an inclined edge detector that detects edges of the source image, and detects whether the source image includes an inclined edge at any of corner portions, each time the image reading device reads the plurality of source documents one by one, the missing portion detector being configured to decide that the source image has a missing corner, when the inclined edge detector detects the inclined edge, when the inclined edge detector detects the inclined edge, the decider calculates, as the shortage value, respective lengths of missing edges to an intersection defined when a first edge that meets one end of the inclined edge, and a second edge that meets the other end of the inclined edge, out of the edges of the source image, are respectively extended along a direction of the first edge and the second edge, and decides whether the length of at least one of the missing edges is equal to or longer than the first threshold, and the controller (i) stores the source image, or causes the image forming device to form the source image, when the decider decides that the respective lengths of the missing edges are both shorter than the first threshold, and causes, when there are one or more next source documents, the image reading device to read the next source documents, and (ii) causes the image reading device to suspend reading the source document, when the decider decides that the length of at least one of the missing edges is equal to or longer than the first threshold, causes the display device to display a notice that the first threshold is changed to the second threshold, stores the source image, or causes the image forming device to form the source image, when the reading resuming instruction, to resume reading the source documents at least including the source document the reading of which has been suspended, is received by the operation device, and when the decider decides that the respective lengths of the missing edges are both shorter than the second threshold, and causes, when there are one or more next source documents, the image reading device to read the next source documents.

3. The image forming apparatus according to claim 1,
wherein the controller restores the first threshold, when the second threshold remains valid, after the image reading device has finished the sequential reading of the images of the plurality of source documents.

4. The image forming apparatus according to claim 1,
wherein the image reading device includes:
a document table having a first platen glass, and a second platen glass on which the source document is to be placed;
a document tray on which the plurality of source documents are to be set;
a document discharge tray;
a document feeding device that draws out the plurality of source documents set on the document tray one by one, transports the source documents through the first platen glass, and discharges the transported documents to the document discharge tray; and
a scanner unit,
the controller decides which of a moving document reading mode, in which the image reading device reads the source documents transported by the document feeding device one by one, with the scanner unit through the first platen glass, or a fixed document reading mode, in which the image reading device reads the source document placed on the second platen glass with the scanner unit, has been selected, causes the missing portion detector to detect the missing corner of the source image, in the moving document reading mode, and restricts the missing portion detector from detecting the missing corner of the source image, in the fixed document reading mode.

5. The image forming apparatus according to claim 1,
wherein the controller (iii) causes the image reading device to suspend reading the source document, when the decider decides that the shortage value of the source image is equal to or larger than the second threshold, causes the display device to display a notice that the second threshold is changed to a predetermined third threshold larger than the second threshold, stores the source image, or causes the image forming device to form the source image, when the reading resuming instruction, to resume reading the source documents at least including the source document the reading of which has been suspended, is received by the operation device, and when the decider decides that the shortage value of the source image is less than the third threshold, and causes, when there are one or more next source documents, the image reading device to read the next source documents.

6. The image forming apparatus according to claim 5,
wherein the controller restricts storage of the source image, or restricts the image forming device from forming the source image, when the decider decides that the shortage value of the source image is equal to or larger than the third threshold, causes, when there are one or more next source documents, the image reading device to read the next source document, restricts storage of the source image, or restricts the image forming device from forming the source image, according to a decision result provided by the decider about the source image of the next source document, and causes the display device to display a page number of the source image the image forming of which was restricted, after the image reading device has finished the sequential reading of the images of the plurality of source documents.

7. The image forming apparatus according to claim 6,
wherein the controller causes the image reading device to suspend reading the source document, when the decider decides that the shortage value of the source image is equal to or larger than the third threshold, and when the missing portion detector detects that the missing corner of the source image is resultant from inward folding of the source document, causes the display device to display a notice that the source document is folded inward, stores the source image, or causes the image forming device to form the source image, when the reading resuming instruction, to resume reading the source documents at least including the source document the reading of which has been suspended, is received by the operation device, and when the decider decides that the shortage value of the source image is less than the third threshold, and causes, when there are one or more next source documents, the image reading device to read the next source documents.

8. The image forming apparatus according to claim 5,
wherein, when the source image has a rectangular shape, the decider adopts a shortest distance, among distances between respective peripheral edges of the source image, and a region where characters or figures are recorded, as the third threshold for making a decision.

9. The image forming apparatus according to claim 1, wherein the controller restricts storage of the source image, or restricts the image forming device from forming the source image, when the decider decides that the shortage value of the source image is equal to or larger than the second threshold, causes, when there are one or more next source documents, the image reading device to read the next source document, restricts storage of the source image, or restricts the image forming device from forming the source image, according to a decision result provided by the decider about the source image of the next source document, and causes the display device to display a page number of the source image the image forming of which was restricted, after the image reading device has finished the sequential reading of the images of the plurality of source documents.

* * * * *